US006559812B1

(12) United States Patent (10) Patent No.: US 6,559,812 B1
McCarten et al. (45) Date of Patent: May 6, 2003

(54) AIRLINE-BASED VIDEO GAME AND COMMUNICATIONS SYSTEM

(75) Inventors: David J. McCarten, Bothell, WA (US); Darren C. Smith, Bellevue, WA (US); Kenji Nishizawa, Bellevue, WA (US); Ramin Ravanpey, Seattle, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/081,088

(22) Filed: May 19, 1998

Related U.S. Application Data

(63) Continuation of application No. 08/080,836, filed on Jun. 24, 1993, now Pat. No. 5,959,596.

(51) Int. Cl.[7] ................................................. G09G 5/00
(52) U.S. Cl. ...................................... 345/2.1; 345/544
(58) Field of Search ................ 345/2, 203; 340/825.24; 348/2, 836; 364/410; 395/712; 463/29, 42; 273/148.13

(56) References Cited

U.S. PATENT DOCUMENTS 3,833,765 A  9/1974 Hilborn et al.
4,110,794 A  8/1978 Lester et al.

(List continued on next page.)

FOREIGN PATENT DOCUMENTS

EP  0 227 014 A   7/1987
EP  0 277 014 A2  1/1988

(List continued on next page.)

OTHER PUBLICATIONS

*Nintendo NEWS PAK*, vol. 1, No. 2, Jul. 1989, "The Power Source," p. 1.
Information Disclosure Statement filed Jun. 10, 1996 in parent application Ser. No. 08/477,667 and document filed UNDER SEAL.

(List continued on next page.)

*Primary Examiner*—Amare Mengistu
(74) *Attorney, Agent, or Firm*—Nixon & Vanderhye, PC

(57) ABSTRACT

An airline-based video game system includes a multitasking master computer, which preferably stores video game and other application programs on its hard disk. The master computer is coupled to a set of airplane zone control computers which also perform conventional cabin management tasks. The zone control computers receive data from the master control computer and couple data to identified seat controlling processing units (SEBs). Each SEB receives data from, and couples data to, a set of unique seat display units which are associated with each seat in the airplane. The system downloads application software to the seat display units from the master computer. After receipt of a downloading request, the master computer responds by setting up an application program transmission for generating the display menu which appears on each SDU.

37 Claims, 23 Drawing Sheets

U.S. PATENT DOCUMENTS

| | | |
|---|---|---|
| 4,471,463 A | 9/1984 | Mayer et al. |
| 4,494,197 A | 1/1985 | Troy et al. |
| 4,582,324 A | 4/1986 | Koza et al. |
| 4,584,603 A | 4/1986 | Harrison |
| 4,647,980 A | 3/1987 | Steventon et al. |
| 4,704,679 A | 11/1987 | Kiremidjan |
| 4,724,521 A | 2/1988 | Carron et al. |
| 4,747,043 A | 5/1988 | Rodman |
| 4,774,514 A | 9/1988 | Hildebrandt et al. |
| 4,814,756 A | 3/1989 | Chauvel |
| 4,843,633 A | 6/1989 | Menich et al. |
| 4,866,515 A * | 9/1989 | Tagawa et al. ............... 358/86 |
| 4,894,774 A | 1/1990 | McCarthy et al. |
| 4,897,774 A | 1/1990 | McCarthy et al. |
| 4,922,420 A * | 5/1990 | Nakagawa et al. ......... 364/410 |
| 4,926,326 A | 5/1990 | McKinley |
| 4,926,327 A | 5/1990 | Sidley |
| 4,965,568 A | 10/1990 | Atalla et al. |
| 4,999,806 A | 3/1991 | Chernow et al. |
| 5,016,876 A | 5/1991 | Loffredo |
| 5,043,908 A | 8/1991 | Manduley et al. |
| 5,083,271 A | 1/1992 | Thacher et al. |
| 5,117,225 A | 5/1992 | Wang |
| 5,222,224 A | 6/1993 | Flynn et al. |
| 5,230,074 A | 7/1993 | Canova, Jr. et al. |
| 5,231,383 A | 7/1993 | Diepstraten et al. |
| 5,237,669 A | 8/1993 | Spear et al. |
| 5,280,627 A | 1/1994 | Flaherty et al. |
| 5,311,302 A | 5/1994 | Berry et al. |
| 5,327,158 A | 7/1994 | Takahashi |
| 5,327,228 A | 7/1994 | Satyanarayana et al. |
| 5,390,293 A | 2/1995 | Nishioka et al. |
| 5,396,635 A | 3/1995 | Fung |
| 5,453,986 A | 9/1995 | Davis et al. |
| 5,469,558 A | 11/1995 | Lieberman et al. |
| 5,497,479 A * | 3/1996 | Hornbuckle ................ 395/491 |
| 5,513,331 A * | 4/1996 | Pawlowski et al. ......... 395/401 |
| 5,581,270 A | 12/1996 | Smith et al. |
| 5,641,319 A | 6/1997 | Stoel et al. |
| 5,675,752 A | 10/1997 | Scott et al. |
| 5,675,828 A | 10/1997 | Stoel et al. |
| 6,147,696 A | 11/2000 | Smith et al. |

FOREIGN PATENT DOCUMENTS

| | | |
|---|---|---|
| EP | 0 268 419 A | 5/1988 |
| EP | 0 419 910 B1 | 4/1991 |
| EP | 0 542 664 | 5/1993 |
| GB | 2151054 A | 7/1985 |
| GB | 2168880 | 6/1986 |
| GB | 2194369 | 3/1988 |
| JP | 63-164233 | 7/1988 |
| JP | 1-34084 | 2/1989 |
| JP | 2625847 | 10/1989 |
| JP | 2629254 | 10/1989 |
| JP | 2864498 | 12/1989 |
| JP | 2-13490 | 1/1990 |
| JP | 2745609 | 7/1990 |
| JP | 2-213374 | 8/1990 |
| JP | 2692238 | 8/1990 |
| WO | 81/01664 | 6/1981 |
| WO | 94/12969 | 6/1994 |

OTHER PUBLICATIONS

Information Disclosure Statement filed Mar. 2, 1998 in parent application Ser. No. 08/477,667 and documents filed UNDER SEAL.

Information Disclosure Statement filed Feb. 13, 1998, in now allowed related patent application Ser. No. 08/080,836 and documents filed UNDER SEAL.

Information Disclosure Statement filed Jul. 19, 1994 in parent application Ser. No. 08/132,293.

Information Disclosure Statement filed Aug. 31, 1994 in parent application Ser. No. 08/132,293.

Information Disclosure Statement filed Oct. 6, 1994 in parent application Ser. No. 08/132,293.

Information Disclosure Statement filed Aug. 30, 1995 in parent application Ser. No. 08/132,293.

Information Disclosure Statement filed Aug. 27, 1998 in related application Ser. No. 08/080,836 and documents filed UNDER SEAL.

Schofield, S.E. "Improving Our Product," *USAIR Magazine*, Sep. 1993, p. 9.

In–Flight Phone Corporation, Full page advertisement for "FlightLink" in *The EntertainAir*, USAir publication, Sep. 1993, Inflight Movies Music & More.

Declarations of Ramin Revanpey, Apr. 30, 1996, Nov. 12, 1993, and Feb. 26, 1998.

* cited by examiner

MAP MODE = 0
BOOT/RUN = 0
SPEED    = X
ZBANK    = X

MAP MODE = 0
BOOT/RUN = 1
SPEED    = 0
ZBANK    = 0

MAP MODE = 0
BOOT/RUN = 1
SPEED    = 1
ZBANK    = 0

MAP MODE = 1
BOOT/RUN = 0
SPEED = X
ZBANK = X

MAP MODE = 1
BOOT/RUN = 1
SPEED = X
ZBANK = 0

MAP MODE = 0
BOOT/RUN = 1
SPEED = 0
ZBANK = 1

MAP MODE = 0
BOOT/RUN = 1
SPEED = 1
ZBANK = 1

MAP MODE = 1
BOOT/RUN = 1
SPEED = 1
ZBANK = 1

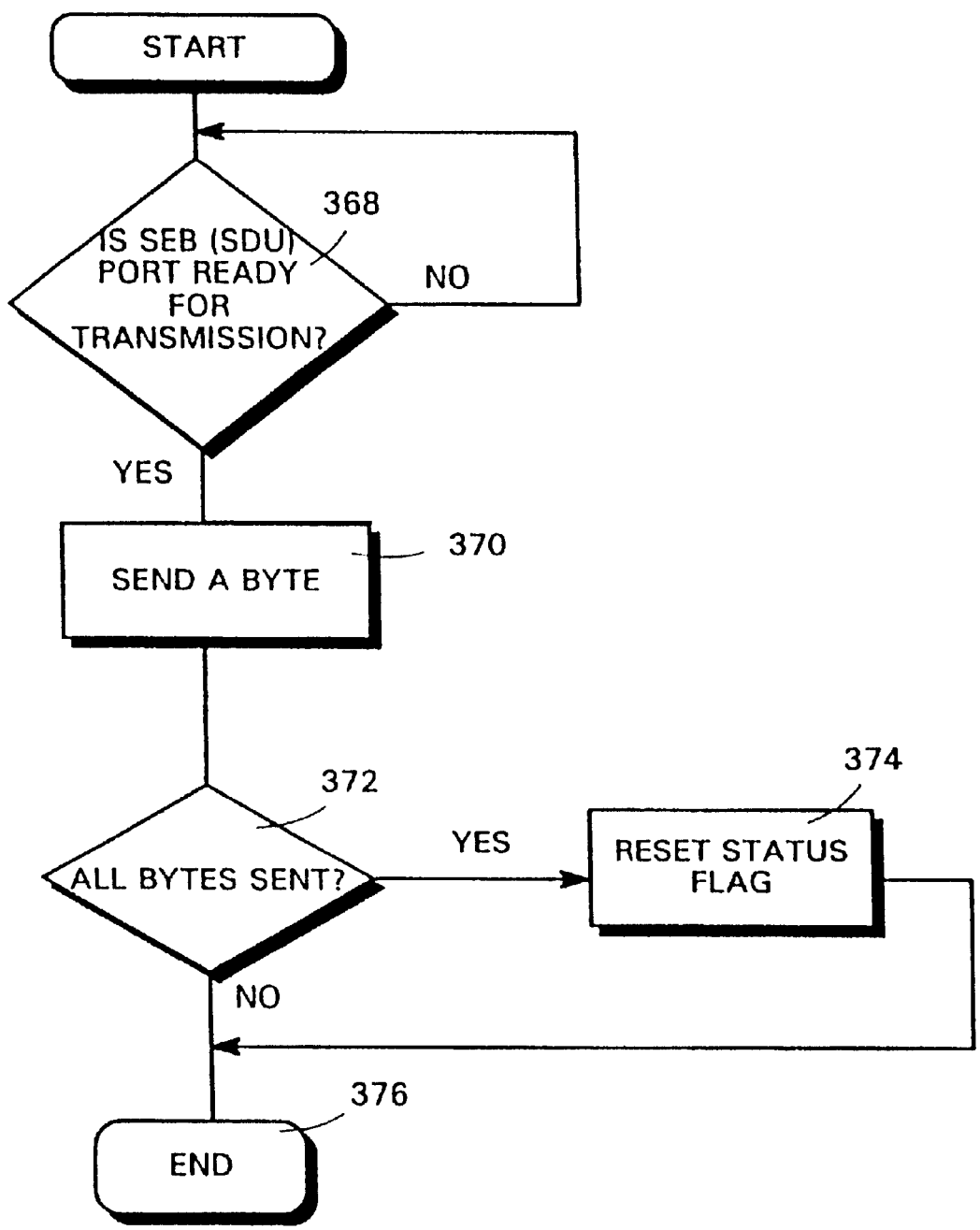

SERIAL PORT RECEIVER - SEB (SDU OR SNS) PORT

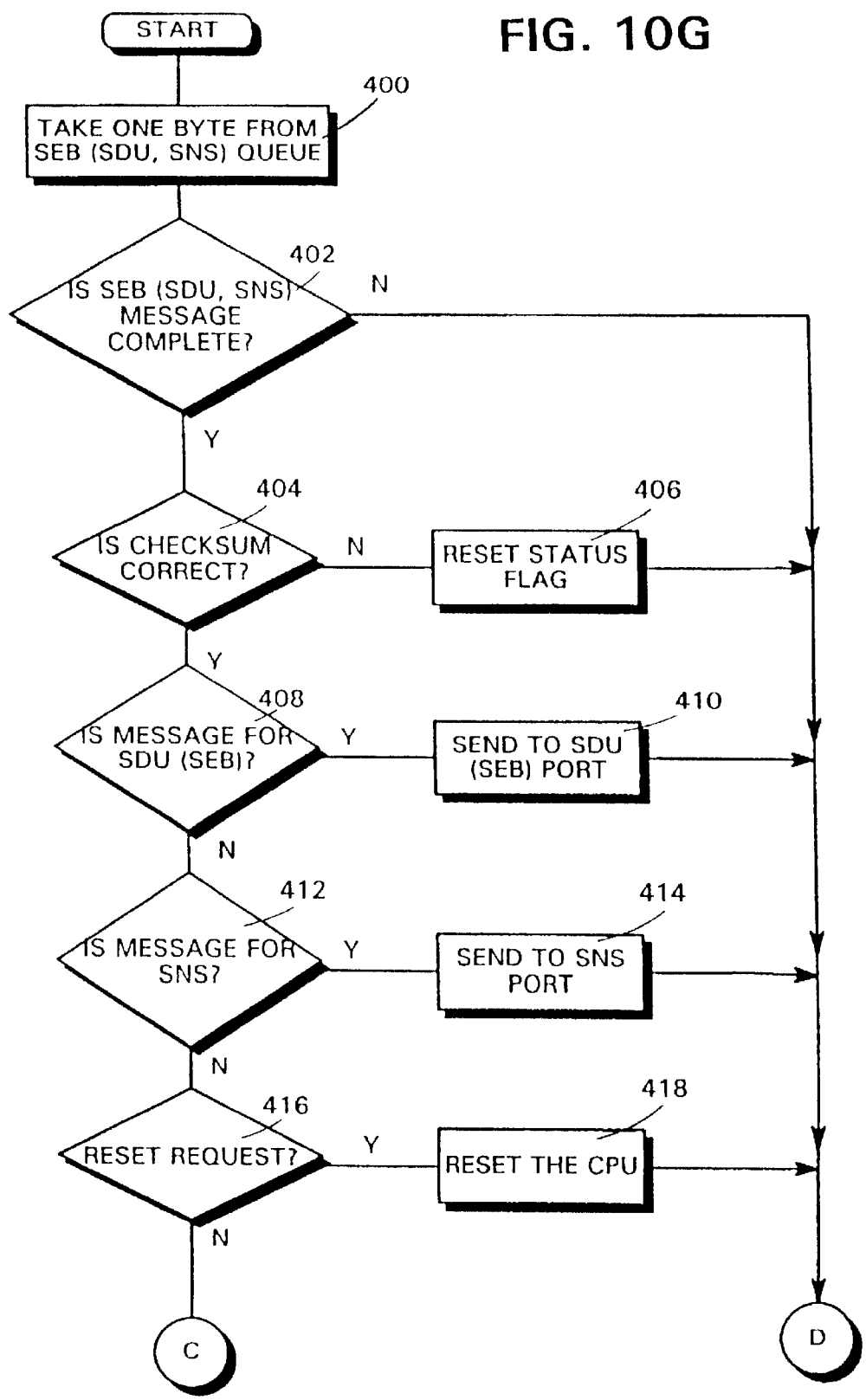

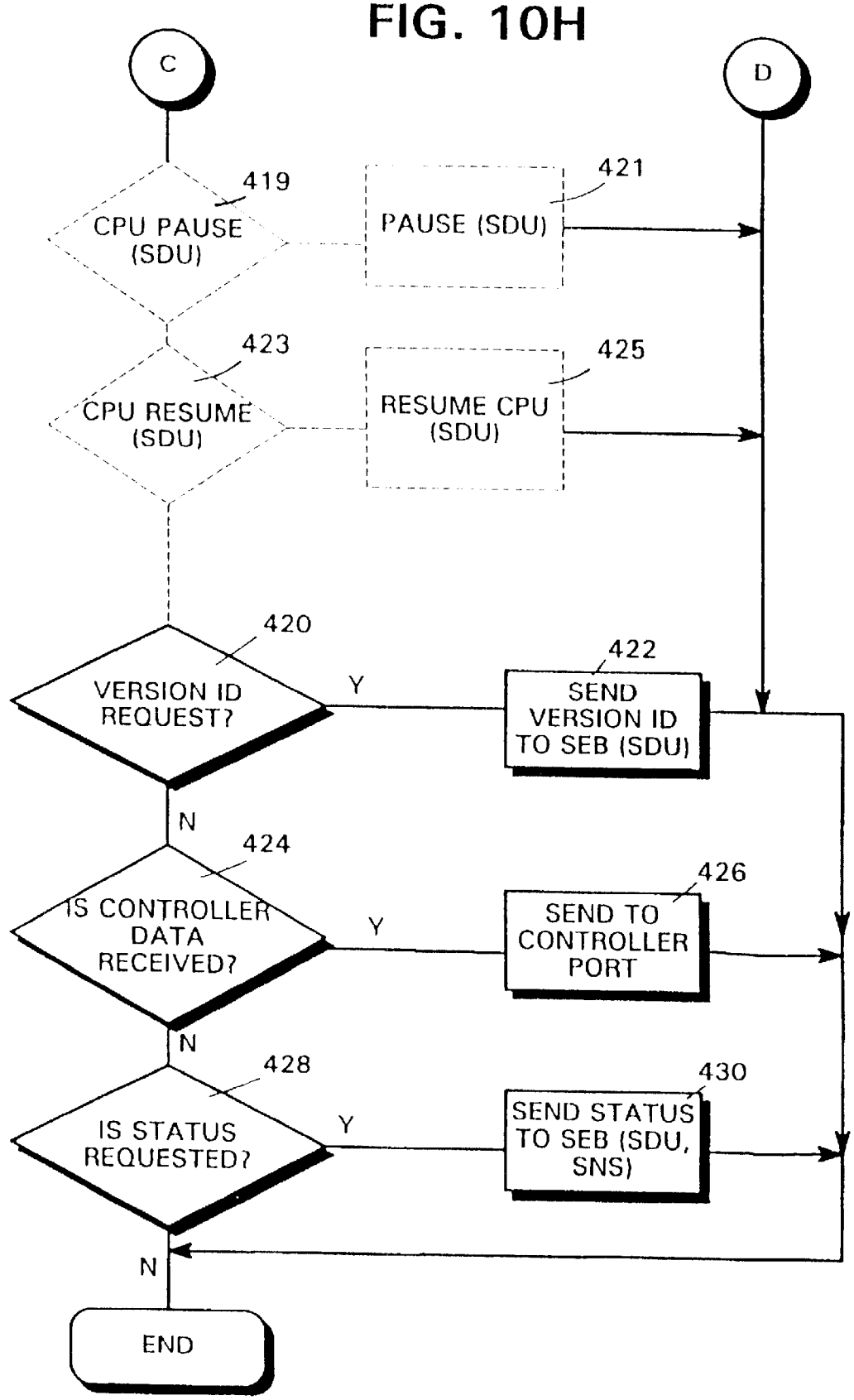

ERROR IN RECEIVER

AIRLINE-BASED VIDEO GAME AND COMMUNICATIONS SYSTEM

This is a continuation of application Ser. No. 08/080,836, filed Jun. 24, 1993 now U.S. Pat. No. 8,959,596.

FIELD OF THE INVENTION

This invention relates generally to a digital communications and entertainment/video game system. More particularly, the invention relates to an airline-based distributed processing video game and communications system associated with substantially every seat in an airplane.

BACKGROUND AND SUMMARY OF THE INVENTION

For the vast majority of airplane passengers, travel time is largely filled with passive activities such as reading magazines, newspapers, or watching a movie provided by an airline during a lengthy flight. Individual passengers who wish to participate in video game play have brought their own portable video game units onto the plane, such as the Nintendo Gameboy product. Similarly, passengers who desire to use a data processor during travel have had to use their own portable laptop computer.

At least one airline has provided limited video game services to first class passengers. This system, however, is believed to be a centrally controlled system in which video game programs are executed by a master computer.

The present invention is directed to a video game/communications system for providing any passenger in the airplane an opportunity to actively participate in video game play or to use other data processing/communication services accessible via an onboard distributed processing communications system.

In an exemplary embodiment of the present invention, a multi-tasking master computer, which preferably stores video game and other application programs on its hard disk, downloads programs which are ultimately downloaded to passengers' seat display units for execution. The master computer, in the exemplary embodiment, is coupled to a set of airplane zone control computers (hereinafter identified as ADBs) which also perform conventional cabin management tasks. The zone control computers receive data from the master control computer and couple data to identified seat controlling processing units (hereinafter identified as SEBs). Each SEB receives data from, and couples data to, a set of unique seat display units which are associated with each seat in the airplane.

In an exemplary embodiment of the present invention, seat display units (SDU) are incorporated into the seat back of each passenger seat (except, of course, of the last row of the airplane). Alternatively, the seat display units may be embodied in a rotatable structure installed in a seat arm rest.

The system downloads application software to the seat display units from the master computer. After receipt of a downloading request, the master computer responds by setting up an application program transmission for generating the display menu which appears on each SDU. The initial applications program downloading results in a menu display at every passenger seat which initiated a request. The applications program is then coupled to each SDU for display on its liquid crystal display screen.

In accordance with a preferred embodiment of the present invention, the display menu advantageously permits each passenger to select between various operating modes including: movies, games, shopping, survey forms, language selection, communication/data processing services. In an exemplary embodiment of the present invention, icons are displayed on the screen to permit a passenger to select any one of the different modes of operation. Communication or data processing services permit selection of in-flight phone services, word processing services, and facsimile services.

If a user opts for video game play, then the available game titles and/or descriptions thereof are displayed. The SDU is itself a multiprocessor system which permits a wide range of video game programs to be executed by a video game computer system. It includes interface processors and associated hardware and software which enable high speed downloading operations to be efficiently performed. The master computer initiates a high speed video game program downloading process to enable the user to play the selected video game.

The above and other features and advantages of the invention and the manner of realizing them will become more apparent, and the invention itself will best be understood, from a study of the following detailed description and the appended claims, with reference to the attached drawings showing some exemplary embodiments of the invention.

BRIEF DESCRIPTION OF THE DRAWINGS

FIGS. 10a through 10I are flowcharts delineating the sequence of operations performed by the microcontroller of the memory board of FIG. 6.

DETAILED DESCRIPTION OF THE DRAWINGS

Figure 1:
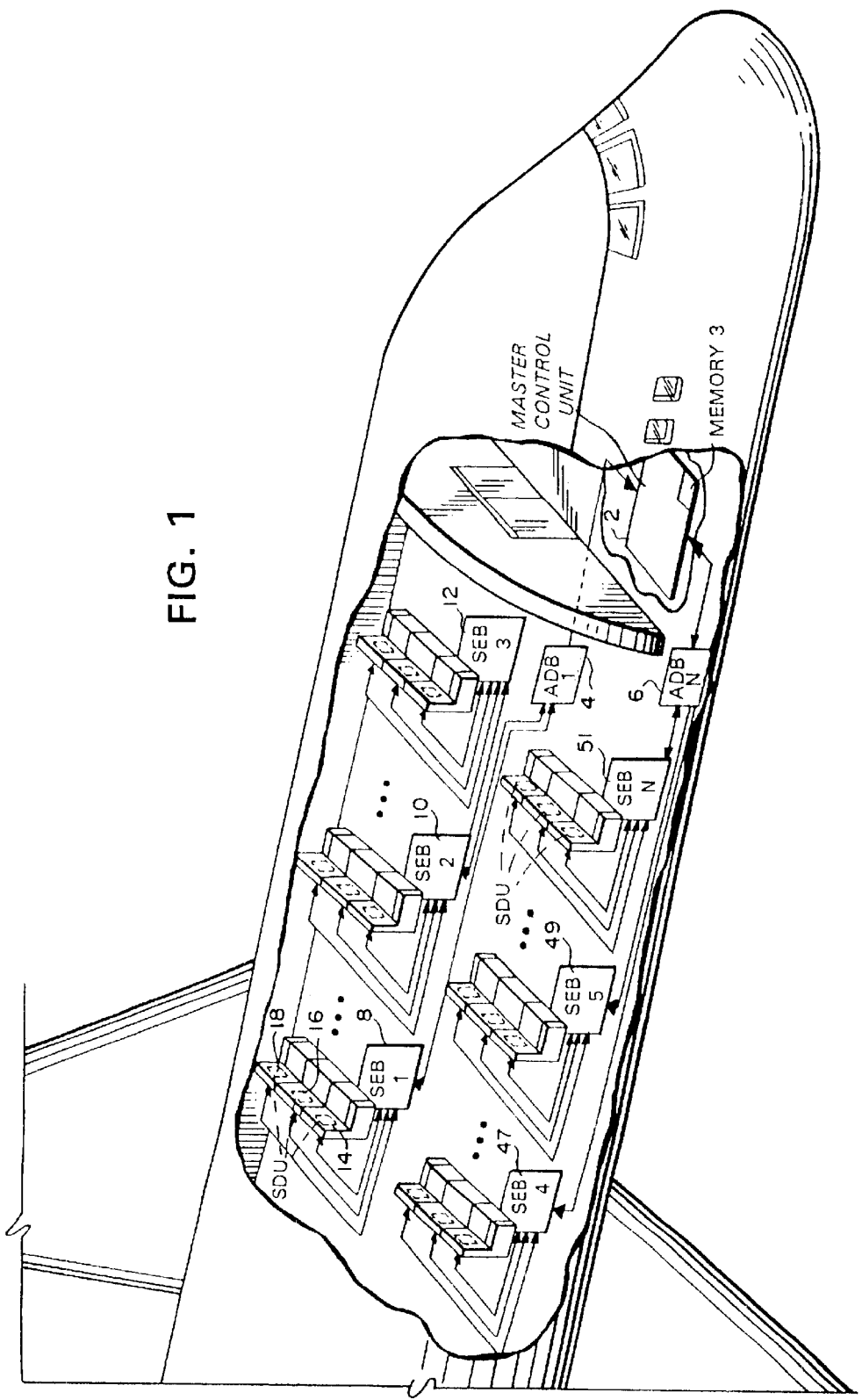
FIG. 1 is a general block diagram of the video game/communications system in accordance with an exemplary embodiment of the present invention.

FIG. 1 is a block diagram of an exemplary distributed processing communications system as installed in an airplane in accordance with an illustrative embodiment of the present invention. Although the presently preferred embodiment of the present invention is installed in an airplane, it is contemplated that the communications system described herein may be advantageously used in other environments such as in a hotel, or an ocean liner. In such alternative embodiments, the system would be modified in various respects such as, for example, by using the hotel room television as the display device.

The airline-based system of FIG. 1 includes a master control computer 2. The master control computer 2 is a multi-tasking computer which, for example, may be an IBM 386 computer running an interactive UNIX operating system. The master control computer 2 includes a conventional communications board which, for example, may be a SEA-LEVEL ADVANCED Communication Board (ACB-II) Part #3061B, which generates synchronous data link control data and which communicates with compatible communications boards installed in other processing modules shown in FIG. 1. The master control computer 2 preferably stores video game and other programs in its memory 3, which may include a hard disk memory system. Such programs are ultimately downloaded to a passenger's seat display unit (SDU) for execution.

The master control computer 2 in the exemplary embodiment shown in FIG. 1 is coupled to a set of airplane zone control computers, designated as ADB 1(4) to ADB-N (6). Both the master control computer 2 and each ADB (1 to N), in addition to performing the video game/communications system tasks described in detail herein, also perform conventional cabin management tasks which are not germane to the present invention. For example, each ADB 1 to N preferably performs under the control of the master control computer 2 such conventional cabin management tasks as assigning seat numbers to each seat in its associated zone, and monitoring the status of the control panels associated with each seat. In a large aircraft such as a Boeing 747, the system may use, for example, 6 ADBs associated with 6 different zones in the aircraft.

The ADBs (1 to N) additionally receive data from the master control unit 2 and couple the data to identified processing units ("SEBs" (1 to M), where M is greater than N) associated with a predefined group of seats. As opposed to exercising direct control over each individual seat, the ADB's (4, 6) couple appropriate control signals to one or more SEB's (8, 10, 12, 47, 49, 51). Each SEB (e.g., 8) includes a processor which exercises control over a group of seat display units (e.g., 14, 16, 18) which are preferably associated with every individual seat in the airplane. Each SEB (e.g., 10) may have, for example, 8 serial ports via which an associated on-board processor receives data from an ADB and passes the data on to any other SEB (e.g., 12) to which it is daisy-chained. Additionally, each SEB (e.g., 8) receives data from and couples data to the set of seat display units (e.g., 14, 16, 18) such as are associated with the seats shown in FIG. 1.

In the presently preferred embodiment, each seat display unit (SDU) is incorporated into the seat back of each passenger seat (except for the last passenger row). Alternatively, the seat display units may be embodied in a rotatable structure installed in a seat arm rest. The SEBs 8, 10, 12 are preferably disposed underneath one of the seats over which it exercises control. Each ADB 4, 6, is preferably installed underneath the floor in, for example, the airplane aisle in its zone. The master control unit 2 may be installed in the belly of the airplane in the first class section.

Figure 2:
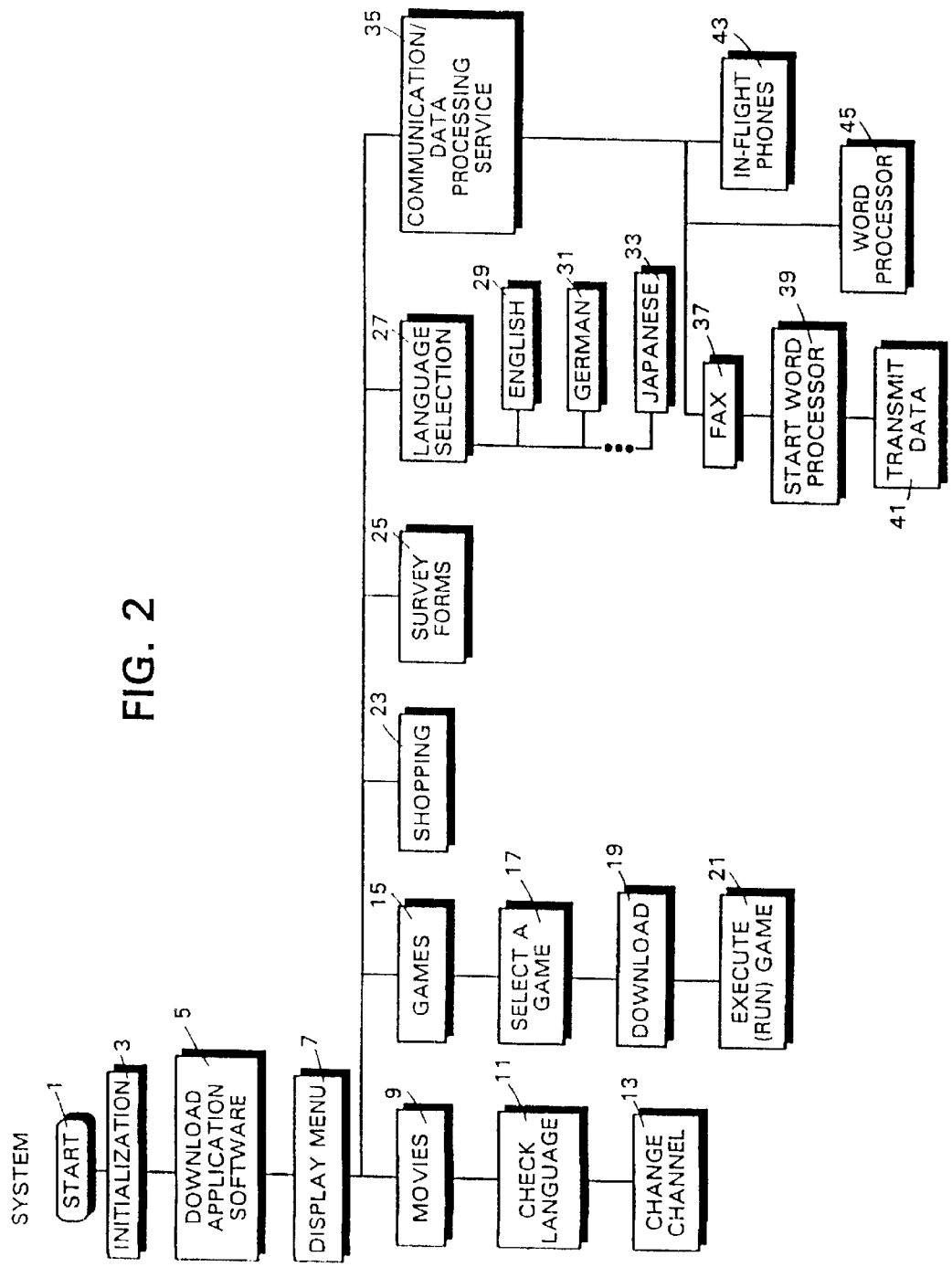
FIG. 2 is a diagram generally depicting the overall operation of an exemplary embodiment of the present invention.

FIG. 2 is an exemplary block diagram which depicts the overall operation of the system shown in FIG. 1 in accordance with an illustrative embodiment of the present invention. As shown in FIG. 2, immediately after power is turned on (1), an initialization sequence is performed (3). During initialization, each seat display unit (SDU) performs its own initialization routine during which various parameters are set to appropriate default values and serial ports are initialized to the correct baud rate. Additionally, as will be explained in further detail below, a version identification number associated with the boot program executed in each SDU is coupled to a microcontroller 190 described in conjunction with FIGS. 4 and 9. The microcontroller (190), which is preferably embodied on a memory board 102 (see FIG. 5) in each seat display unit, receives the version identification number and performs input/output interfacing functions for the memory board 102. The master control unit 2 also performs conventional initialization functions including polling each of the ADBs 4, 6, etc., requesting the ADBs to assign seat numbers and to report back such seat assignments together with an indication that communication has been established with such seats.

After initialization (3), applications software is downloaded to the seat display units 8, 10, 12, etc., via respective ADBs 4, 6, etc (5) and SEBs. The downloading is initiated in response to a downloading request from each SDU coupled to the master control unit 2 via the respective SEB's and ADB'S.

After receipt of the downloading request, the master control unit 2 responds by setting up an applications program transmission for generating the display menu which appears on each SDU (7). The initial applications program downloading results in a menu display at every passenger seat SDU 14, 16, 18, etc., that initiated a request. The applications program is coupled to each SDU through an ADB and SEB via an RF channel selected by an on-board tuner (See FIG. 4) associated with each SDU. The tuner permits the transmitted application program to be executed by the requesting SDU resulting in a menu display on a liquid crystal display screen associated with each seat in the airplane.

In accordance with the presently preferred embodiment of the present invention, the display menu permits the user to select between various operating modes including: movies 9, games 15, shopping 23, survey forms 25, language selection 27, communication/data processing services 35. Initially, the user may be prompted to initially select a language (27) so as to choose between English 29, German 31, Japanese 33, etc. The language selection, in turn, determines the language used with, for example, any subsequent movie selection, etc.

In an exemplary embodiment of the present invention, icons are displayed on the screen to permit the user to select any one of the different modes of operation. If the movie option 9 is selected, a check is made to ensure that the movie is presented in the appropriate language (11). The channel is then changed (13) for receipt of the selected movie via an associated VCR (not shown).

Communication or data processing services 35 may be selected to select between in-flight phone services 43, word processing services 45, and fax services 37. It is contemplated that the seat display units may include a port for receiving a keyboard input which, in one illustrative embodiment of the present invention, is distributed by airline personnel upon request. Alternatively, the system may be expanded to include, in association with at least some seats in the airplane, a keyboard which is rotated into operating position upon selection of word processing 45 or facsimile services 37.

If the passenger selects facsimile services 37, then the user is prompted to begin formulation of a message to transmit 39. After composition of the message, the user enters an end of message or other special control character to indicate that the message may be transmitted (41).

If the user opts for video game play (15), then available game titles and/or descriptions thereof will be displayed to the user (17). Thereafter, the master control unit 2 initiates a video game program downloading process which is explained in detail below in conjunction with FIGS. 3A and 3B (19). The system then begins executing the game program and the passenger is able to play the selected video game.

The communications system of the present invention also includes a shopping service option (23) in which a wide range of available items may be selected by the user for purchase via credit card. Additionally, the system has the capability of requesting passengers to complete survey forms (25).

The entertainment and data processing services selectable via the communications system of the present invention shown in FIG. 2 are by way of example only. The present invention contemplates that additional services may be among the selectable options such as books or magazines which may be stored in a mass storage media associated with master control unit 2. Additionally, it is contemplated that a selection of educational programs may be provided in addition to the selectable video games.

Figure 3A:
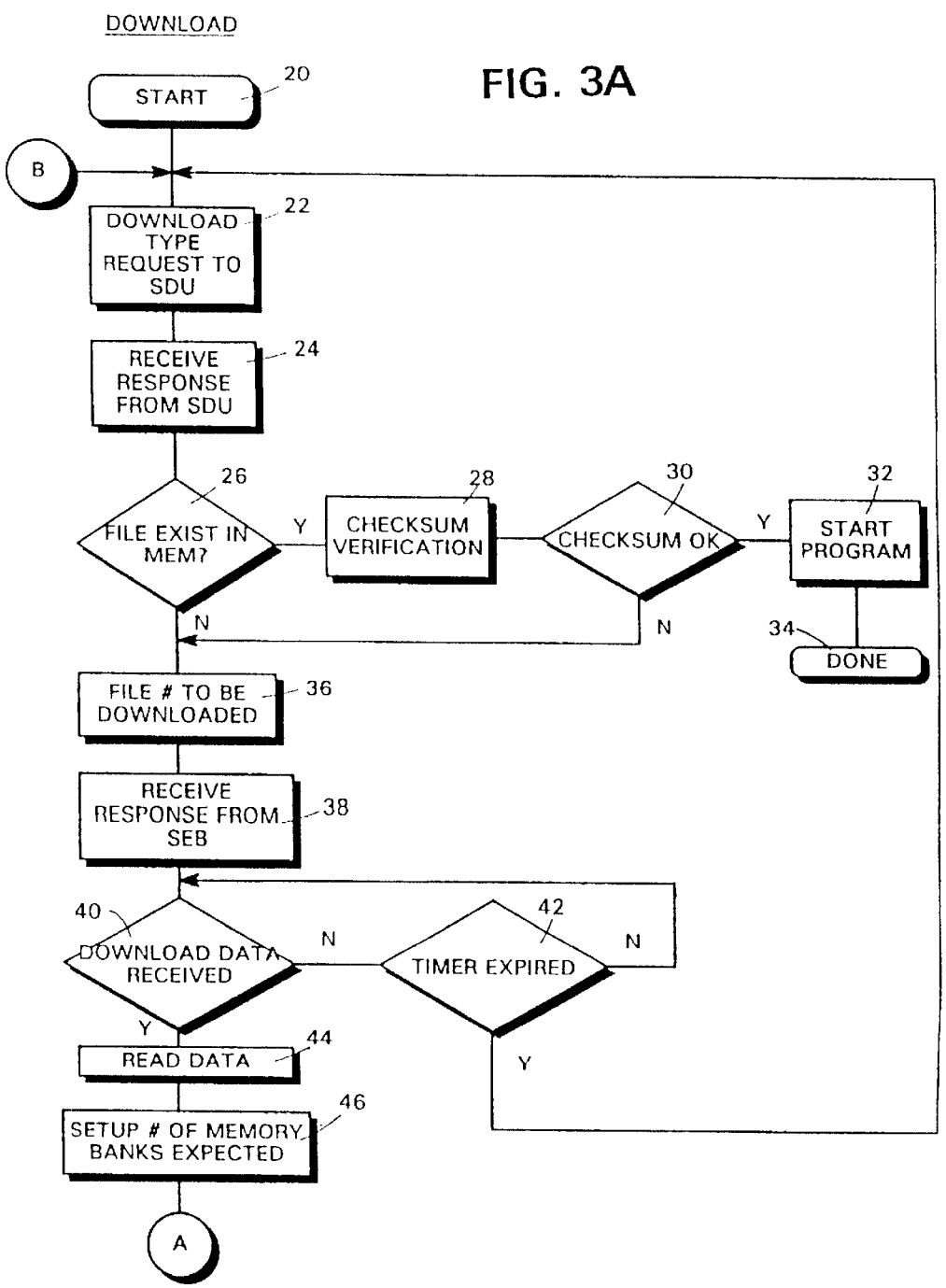
FIGS. 3A and 3B are flowcharts delineating the sequence of operations involved in downloading information to the seat display units.
Figure 3B:
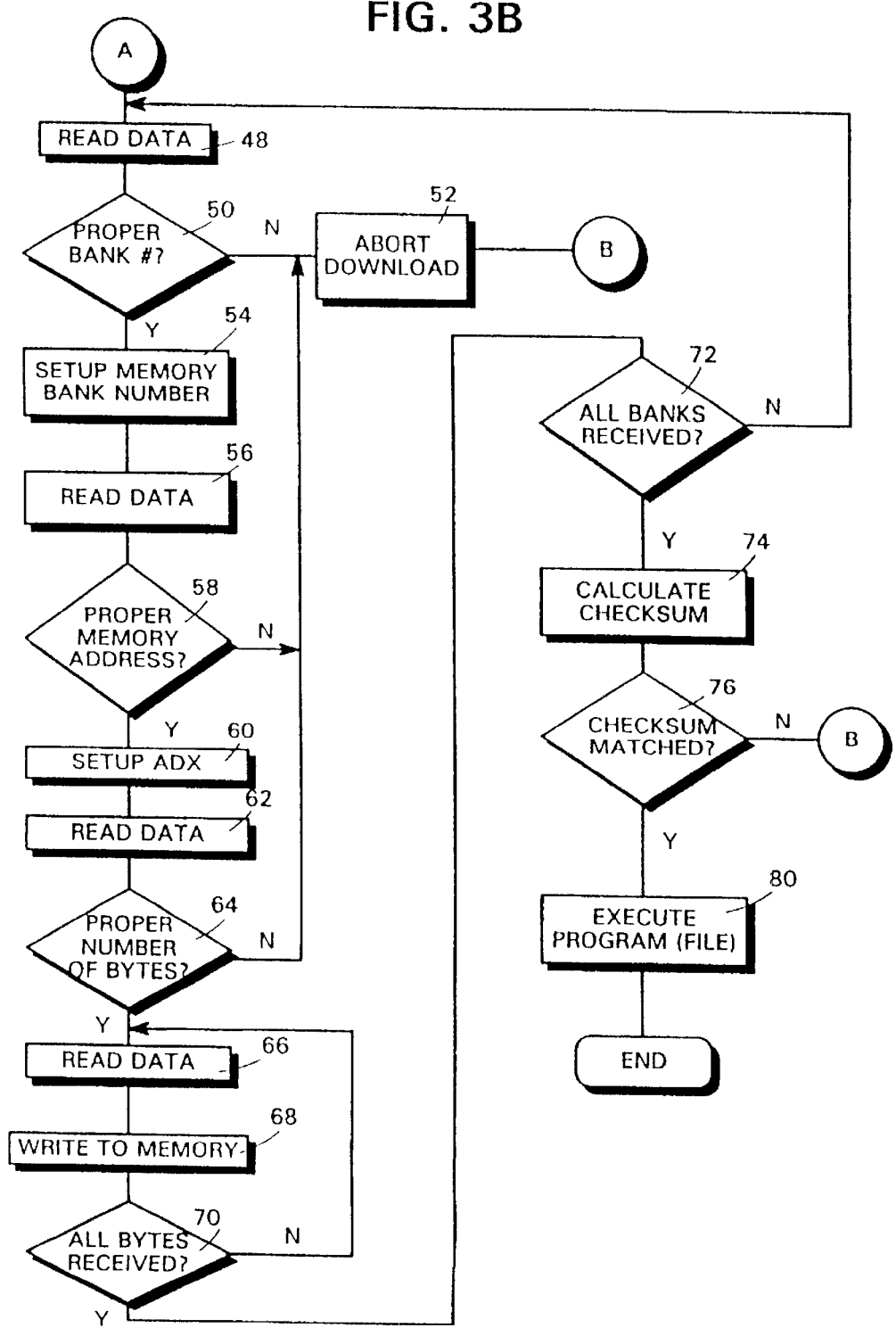

FIGS. 3A and 3B are a flowchart delineating in more detail the sequence of operations performed during the downloading operation shown at blocks 5 and 19 of FIG. 2. As indicated in FIG. 3A, upon initiation of the download operation (20), execution of the boot program results in the forwarding of a "download type" request to the SDU's interface controller 84 (FIG. 4) via microcontroller 190 (FIG. 6). The downloading may be of either an applications program, a specific video game program, or any other program executable on the system. Upon receiving the request regarding the "download type", the SDU interface controller 84 responds by sending instructions and parameters back for use by the boot program including, for example, the file number and other parameters such as may be used in defining an address mapping mode (as is explained in detail below) (24). The SDU controller 84 saves such information in its memory and the controller makes a decision regarding what should be downloaded next. The file number is sent to an SEB and is passed through the microcontroller 190 which saves the file number for the downloading process. Upon receipt of such information, a nonvolatile memory on a memory board (100 in FIG. 5) is checked by the executing boot program to determine whether a file having a file number matching that just received is stored in a pseudo-static RAM on the memory board (26). If the file does exist in memory, as indicated by the check in block 26, then a checksum verification of the identified area in memory is performed (28). If the checksum test is passed, then program execution is started (32) since the downloading operation has already been completed (34).

If the checksum test is not passed, or the determination in block 26 reveals that the file does not exist in memory, then the boot program being executed by each game processor requests that the identified file number be downloaded and forwards such a request to an SEB. The SEB forwards it to the master control unit (36). The SDU receives an acknowledgement of the request for a file number to be downloaded (38) after which downloading is scheduled to commence.

The boot program, as indicated at block 40, next checks to determine whether downloaded data has been received. If not, a further check is made to determine whether a timer has expired (42). If the timer has not expired, then the routine branches back to block 40 where a check is again made for downloaded data. If the timer expires before downloading has commenced, the downloading branches back to node B of FIG. 3A, where the downloading process begins again. If data has been received, the boot program reads the first byte of downloaded data (44) and treats the first byte of data as identifying, for example, the number of memory banks expected (46). In accordance with an illustrative embodiment of the present invention, the order in which such "configuration" data must be received may function as a "security" mechanism which permits only authorized programs to be downloaded.

As indicated in FIG. 3B, at block 48, the next byte is then read. A check of the next byte is made to determine whether it identifies the proper bank number (50). If a proper bank number has not been identified, the download is aborted (52) and the routine branches back to node B to start the process again.

If the proper bank number has been identified, then the downloaded memory bank number is set up (54) and the next two bytes of data are read (56). As indicated in block 58, a check is made to determine whether the two bytes of data read in block 56 identify the correct memory starting address. If the correct starting memory address has not been defined, then the routine branches to block 52 to abort the download. If the proper memory starting address has been identified, as indicated in block 60, the identified starting address is set up. The next two bytes of data are then read (62) identifying the number of bytes in the bank and a check is made in block 64 to determine whether the proper number of bytes have been identified. If not, the routine branches to block 52.

If the proper number of bytes have been identified, then data is read at block 66, which is actual program related data. Thereafter, after each byte is read, the byte is written to memory 68. As indicated at block 70, a check is then made to determine whether all bytes in the bank have been received. If all the bytes have not been received, then the routine branches back to block 66. If all bytes have been received, then a check is next made to determine whether all the identified banks have been received (72). If all banks have not been received, then the routine branches to block 48 for further bank processing.

If all banks have been received, then a checksum is calculated of the downloaded memory contents (74). If the checksum matches, a stored checksum value, the program is executed (80) and the routine ends. If the checksum does not match, then the routine branches to node B in FIG. 3A where the downloading process begins again. There is a second timer activated when downloading starts. If the entire download process is not finished within a preset time, then the download is aborted, and the process starts from the beginning, i.e., block 22 of FIG. 3A.

Figure 4:
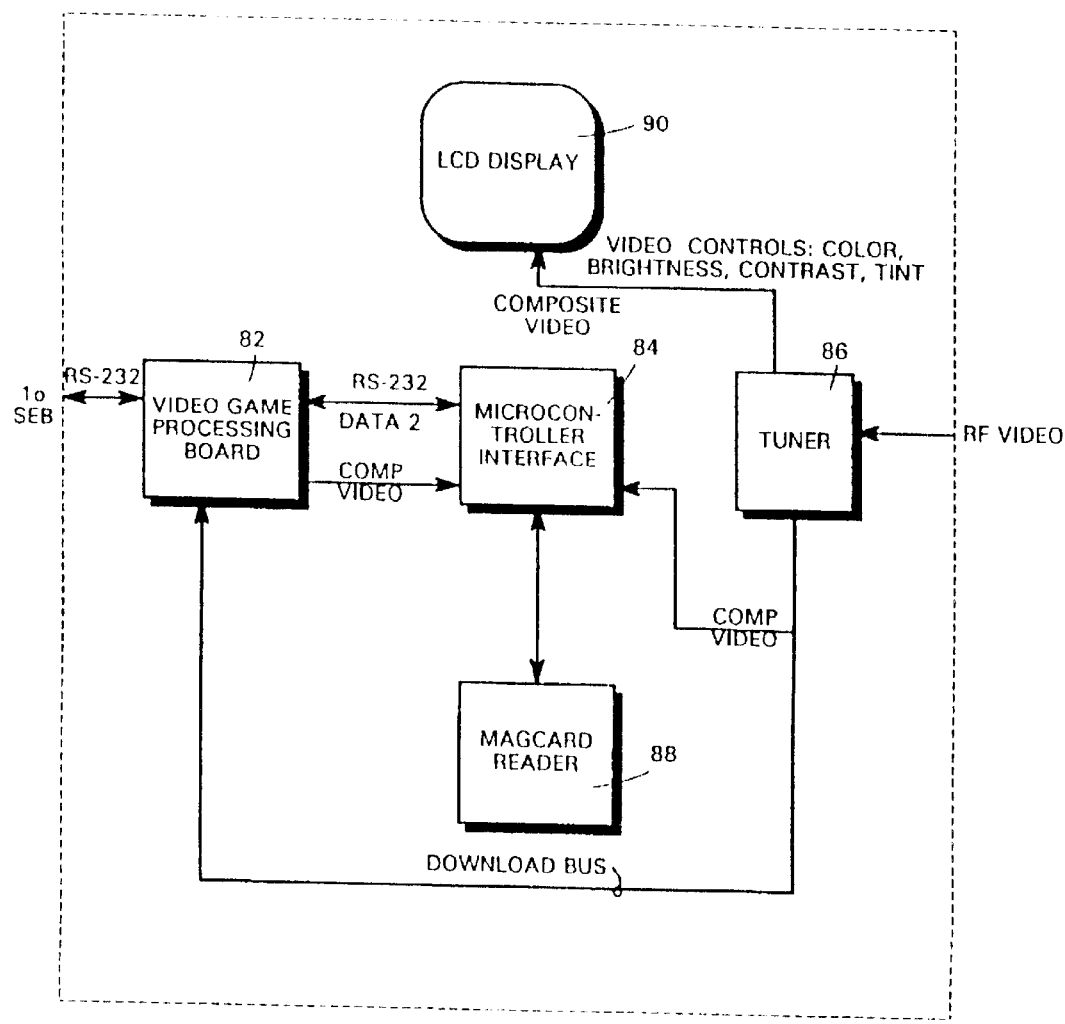
FIG. 4 is a block diagram of a seat display unit.

FIG. 4 is a block diagram of an example seat display unit (SDU). The seat display unit shown in FIG. 4 includes a video game processing board 82 which is described in further detail in the figures below. Although in general a seat display unit is used to implement the invention, the particulars of the seat display unit, other than the video game processing board, are not important. For example, the specific configuration of elements shown in FIG. 4, are not needed to practice the invention. Indeed, many other seat display unit configurations incorporating the video game processing board 82 may be used to implement the present invention.

The video game processing board 82 is coupled to a duplex RS 232 type communication bus that is coupled to an SEB (e.g., 8, 10, 12) in the airline video game system of FIG. 1. The video game processing board 82 is also coupled to a video game controller which may be the hand-held controller used in conjunction with the Super Nintendo Entertainment System (SNES) sold by the assignee of the present invention. The video game processing board 82 also receives program instructions and data at high speeds from tuner 86 via the download bus shown in FIG. 4. The tuner 86, in turn, receives program information and data via an RF video channel from the master control unit 2 which couples program instructions and data to the requesting SEB. The tuner 86 in response to the incoming signal on RF video bus selects an identified channel in a conventional manner and couples a received composite video signal to interface 84. If a user selected a movie, the tuner would be programmed to select a predetermined channel. Alternatively, if a user selects a video game program, then a predetermined data channel is selected for the downloading of program information and data. The tuner 86 is selectively switched by a commercially available interface controller 84. The tuner 86 may be an off-the-shelf tuner which may, for example, be a Phillips FS936E.

The microcontroller interface 84 includes an 8 bit microcontroller which performs interface operations for controlling the LCD display 90 and the tuner 86. The microcontroller may, for example, be a commercially available 8051 microprocessor manufactured by Phillips Electronics. Interface 84 may, for example, supply the color, contrast, brightness, and other control signals for controlling the LCD display 90. The microcontroller interface 84 additionally reads information from the magnetic card reader 88. The microcontroller interface 84 includes on-board random-access memory (not shown). The microcontroller interface 84 receives the composite video signal from the video game processing board and couples such signals to the LCD display. The microcontroller interface 84 communicates with the video game processing board's on-board microcontroller (MCU 190 in FIG. 6) via a serial communication link. The communication port coupled to microcontroller 190 which is linked to microcontroller interface 84 is referred to herein as the SDU port of the MCU 190.

The seat display unit also includes a magnetic card reader 88 which is used to read information magnetically stored on the magnetic strip of a user's credit card. The information is read via the interface processor's serial I/O port which couples information to the video game processing board 82 which, in turn, sends this billing information to a SEB, an ADB and to the master control unit 2 for storage. The SDU additionally includes an LCD dot matrix display 90 which may, for example, be a conventional 6" panel Color TFT-LCD AV type display manufactured by Sharp Corporation commercially sold under manufacture model #LQ6NCO2. The LCD display 90 receives a composite video signal from the interface 84 which, in turn, receives the composite video signal from tuner 86. Tuner 86 also provides the LCD display 90 with video control signals such as the signals controlling the horizontal and vertical scanning operations and provides color, brightness, contrast and tint related signals in a manner understood by those skilled in the art.

In operation the video game processing board 82, after power up, informs the interface processor 84 that it is in need of instructions. The interface processor 84 responds to the request from the video game processor board 82 by providing an indication of the type of file which must be downloaded and the associated parameters which must be received. The interface processor 84 is programmed to distinguish between power-on reset and other error induced resets and provides the instructions to the video game processor board 82 to either request a display menu or a particular type of program to be downloaded. The video game processing processor 82 then requests via the RS232 communication bus and its associated SEB, the appropriate downloading operation. The master control unit 2 then downloads the required information via tuner 86 to the appropriate display unit. A composite video signal is passed from video game processing board 82 to microcontroller 84 to LCD display 90.

Figure 5:
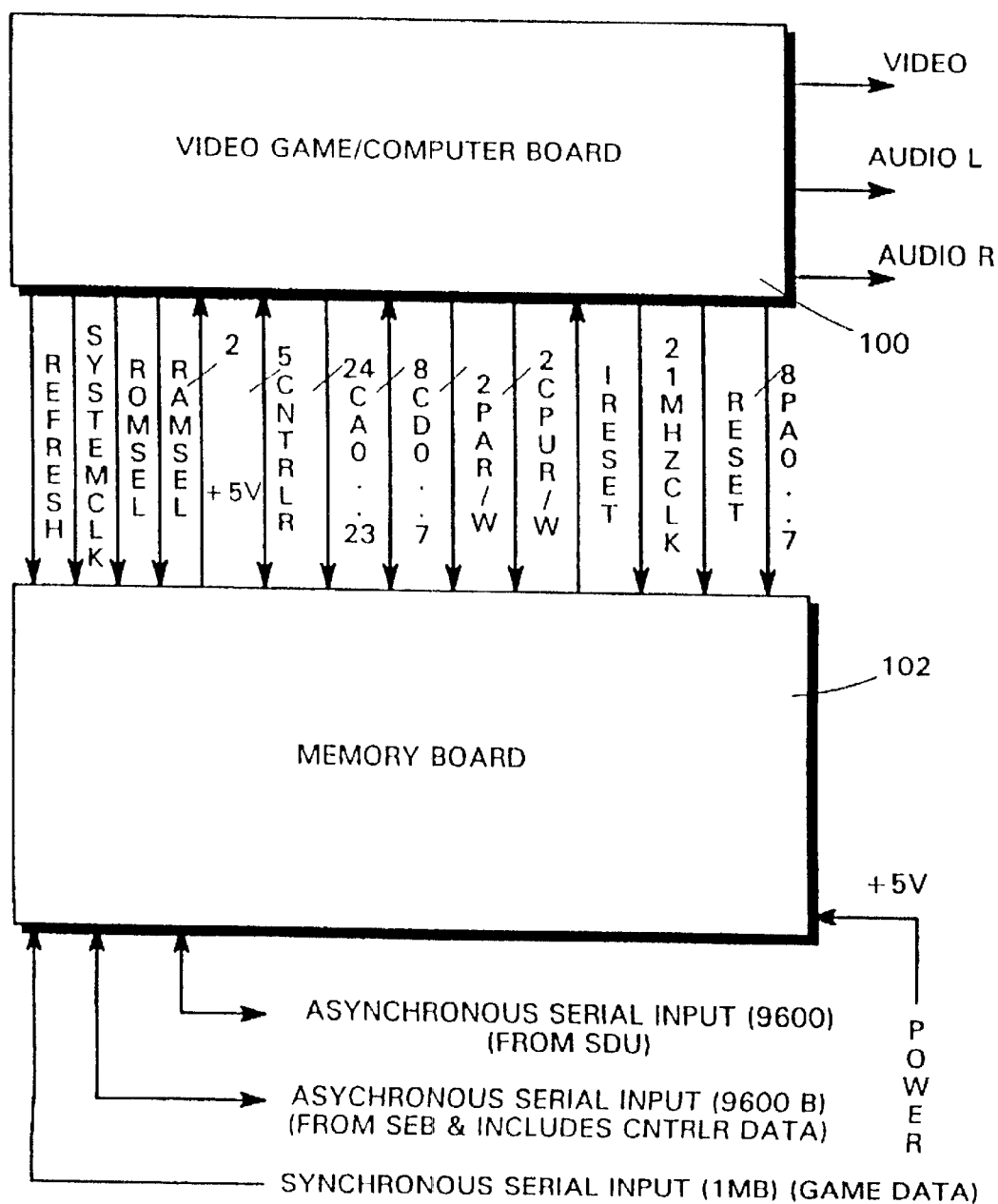
FIG. 5 is a block diagram of the video game processing and storage system in an exemplary passenger seat display unit.
Figure 6:
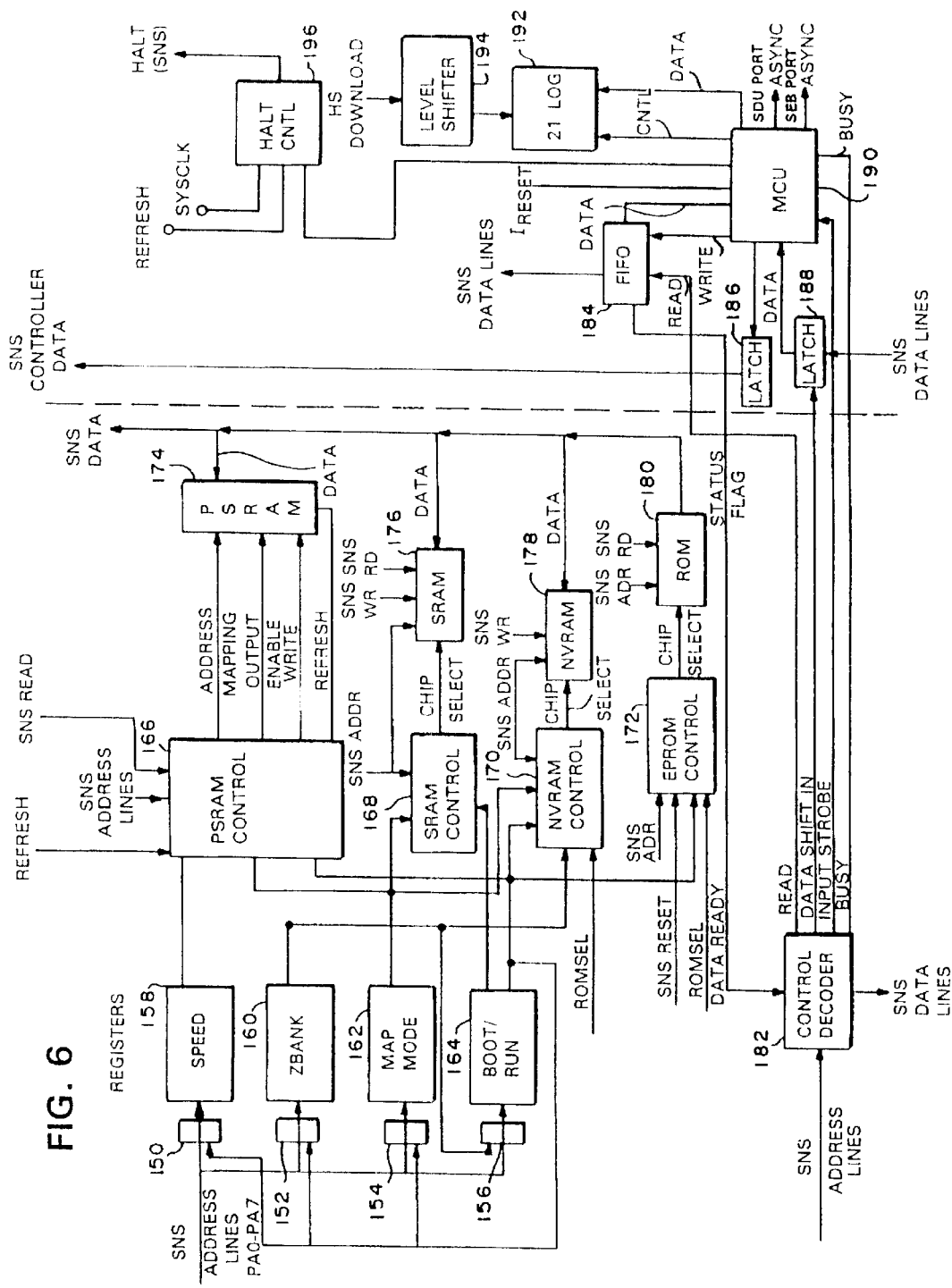
FIG. 6 is a detailed block diagram of the memory board shown in FIG. 5.

FIG. 5 is a general block diagram which shows the significant data and control signals associated with the video game processing board 82. The video game processing board 82 includes a video game computer board 100 and a memory board 102 both of which are described in further detail below. In the presently preferred exemplary embodiment of the present invention, the video game computer board is a compact version of the Super NES video game system (which lacks the RF modulator module that in the commercial SNES couples the processor to a conventional television monitor). The memory board 102 includes storage devices for storing downloaded game program, game character data and other applications program information. The memory board 102 additionally includes a boot read-only memory (ROM) whose boot program executed upon power on determines whether the pseudo static RAM in the memory board 102 contains the expected program information and performs other operations as explained below in conjunction with FIGS. 9A–9C. In the presently preferred embodiment, the memory board also contains a microcontroller 190 shown in FIG. 6 together with a ZILOG communications controller model number Z85233.

Turning next to the data and control signals which are exchanged between the video game/computer board 100 and the memory board 102, a refresh signal REFRESH is coupled to the memory board 102 to refresh the random access memory (RAM) devices in a manner that will be appreciated by those skilled in the art. The computer board 100 also couples a system clock signal and a 21 MHz clock signal to the memory board. The system clock signal provides the necessary clocking for register functions and for the memory board RAM in a manner understood by those skilled in the art. The system clock preferably permits the clocking rate to be selectable to at least a limited extent. The ROMSEL and the RAMSEL signals are generated by the video game computer board and are used as chip enable signals which are processed by decoding logic in the memory board to select the appropriate memory at the appropriate time. As shown in FIG. 5, various power lines and bidirectional control lines are also coupled to the memory board and the video game computer board.

Among the control signals coupled to the video game computer board 100 are video game control signals generated by a player hand-held controller. These signals are coupled to the video game computer board 100 via a microcontroller on the memory board 102. In a preferred embodiment of the present invention, the signals generated by a conventional SNES type game controller are latched by a logic circuitry within the memory board 102. In accordance with the present exemplary embodiment, the controller signals are first routed through a SEB associated with the SDU and are coupled to the microcontroller which latches the player input signals and couples these signals to the video game computer via the controller lines shown in FIG. 5. In the memory board 102, two 8-bit latches are used to provide 16 bits of player controller information to the video game computer board 100.

The video game computer board has 24 address lines CA0–CA23 which are coupled to the memory board 102 and used to address the memory devices embodied therein. Additionally, 8 data lines are used for exchanging data between the memory board 102 and the computer board 100. The memory board 102, as will be explained further below, includes a pseudo static RAM for storing program information which, like other memory in memory board 102, is coupled to the address data lines. The video game computer board 100 also includes additional control lines for coupling read or write signals to the memory devices on the memory board 102.

The memory board 102 also includes an IRESET line for providing an externally generated reset signal to the video game computer board 100. IRESET is used when the system needs to be reset due to communication problems which may develop from time to time on an airplane or when communication must be terminated due to other higher priority communications. The RESET line shown in FIG. 5 is used to reset the elements embodied in the memory board upon power-up to permit voltage levels to settle. The computer and memory board are also interconnected via an 8 bit address bus PA0–PA7 which permits addressing of registers to be described below which are located in a particular CPU address space.

The memory board 102 receives a high speed synchronous serial input which includes program information downloaded from the master control unit via tuner 86 such as shown in FIG. 4. Such synchronous serial input is received at, for example, one Mbaud which may include game program or application program information which has been converted into the appropriate format via the ZILOG Z85233 communications controller. The memory board also includes an asynchronous serial input port which receives input at 9600 baud including game controller data that is received from an SEB. Additionally, a further asynchronous input port is included which receives information from the microcontroller interface 84 at, in an exemplary embodiment, 9600 baud. The memory board 102 receives a 5 volt power signal. Additionally, the video game computer board 100 outputs video signals which are coupled to the LCD display 90 via the microcontroller interface 84 and additionally, outputs left and right channel audio signals.

FIG. 6 is a block diagram of the circuitry embodied on the memory board 102 shown in FIG. 5. The memory board 102 includes decoder logic 150, 152, 154, 156 which may include associated registers 158, 160, 162, 164 and may, for example, be implemented programmable array logic (PAL). The decode logic 150–156 performs decoding and register loading related functions as will be explained in detail below.

Associated with each decode logic 150, 152 154, 156, is a single bit register. Register 158 is identified as the speed register. Register 160 is identified as the Zbank. Register 162 is identified as the map mode register and register 164 is identified as the boot/run register. The function of the registers 158–164 are explained further below. The bits stored in the respective registers are input to a pseudo RAM (PSRAM) controller 166 which, in turn, selects in accordance with the state of the output from registers 158–164, the pseudo RAM 174 address mapping mode. The address mapping functions implemented by the PSRAM controller 166 permits diverse games using different address mapping modes to be executed using the same memory board hardware.

The pseudo-static RAM controller 166 in addition to performing address mapping functions also provides a pseudo-static RAM output enable signal for read function, a write enable signal, and generates the refresh signal required for the pseudo static RAM 174. The pseudo static RAM controller 166 receives address data from the Super NES address lines (as shown in FIG. 5). This address data is interpreted dependent upon the state of registers 158–164, which, in turn, are set in response to the address signals input from decode logic 150–156 via address lines as PA0–PA7. In the illustrative embodiment, the pseudo-static RAM 174 is preferably a 2 Mbyte RAM which is also responsive to PSRAM controller signals as shown in FIG. 6.

The registers 162, 164 are also coupled to static RAM controller 168 which controls access to RAM 176 by generating a chip select signal based upon output that is received from registers 164, 162. The static RAM 176 is addressed via address signals on the Super NES address bus and is responsive to the Super NES read and write control signals as shown in FIG. 6.

The registers 160, 162 and 164 are also coupled to a non-volatile RAM controller 170 which generates a chip select signal for non-volatile RAM 178. Non-volatile RAM 178 is addressed from the SNES address bus and receives write control signal and read control via chip enable as shown in FIG. 6. The contents of boot/run register 164 as well as SNES reset and ROM select signals are coupled to EPROM controller 172 which generates a chip select signal at the appropriate time to read the EPROM 180. The EPROM controller 172 receives an address from the Super NES address bus. The EPROM may be written in response to an SNES write control signal. Each of the pseudo-static RAM 174, SRAM 176, non-volatile RAM 178 and boot ROM 180 is coupled to the SNES address and data buses.

The pseudo-static RAM 174 stores either a downloaded game program or the downloaded applications programs as described above. The static RAM 176 stores various types of game parameter information and operates as a scratch pad memory. The non-volatile RAM 178 stores information generated by an applications program and information relating to the status of the pseudo-static RAM 174 including information identifying the kind of data stored in the pseudo-static RAM 174.

The memory board 102 also includes in the present exemplary embodiment an interface microcontroller 190 which may, for example, be a Hitachi H8/325 microcontroller. The microcontroller 190 performs functions which are described in detail below.

Memory board 102 additionally includes a control decoder 182 that is coupled to the SNES address lines. In response to signals received on the SNES address lines, control decoder 182 couples a "data ready" signal to microcontroller 190, a "read" signal to first-in first-out (FIFO) buffer 184, provides a "data shift in" signal to latch 188 (which receives data from the SNES data lines) which, in turn, shifts data out to microcontroller 190. The FIFO 184 receives high speed downloaded information from microcontroller 190 and stores such data in response to the "write" signal generated by MCU 190. The control decoder 182, in response to a read control signal on its input address lines triggers a read operation from FIFO 184. If there is no data available in FIFO 184 upon request, a "data not ready" signal is generated by FIFO 184 which is coupled to control decoder 182 and to the SNES data lines. To write data to MCU 190, the SNES processor checks the "busy" line which indicates if MCU 190 can receive data. If MCU 190 can receive data, then one byte is shifted in latch 188, which, in turn, activates the "Busy" signal by sending a "Input Strobe" signal. If MCU 190 cannot receive data, SNES continues to check the "busy" signal.

The microcontroller 190 additionally controls a ZILOG serial communications controller 192 which is coupled to the tuner 86 shown in FIG. 4 for receiving high speed downloaded program instructions and data. The downloaded program instructions and data are coupled to the ZILOG serial communications controller 192 via voltage level shifter 194. The high speed downloaded data from the tuner 86 has a logic level of 0 to 1 volts. Level shifter 194 is a conventional level shifter which converts the 0 to 1 volt data to 0 to 5 volts.

The memory board 102 also includes a halt controller 196 which is coupled to microcontroller 190. The halt controller 196 is designed to couple a halt signal to the video game computer. The halt signal may be generated to halt game play after a predetermined time period, e.g., 1 hour after initiation, so that the user may be prompted to request further playing time and to pay for such time. Additionally, the halt controller may be programmed to be responsive to public address announcements or other events on the airplane deemed to be events which should trigger the halt condition. The halt controller 196 ensures that the halt does not take place at any arbitrary time, but requires halting in sync with a memory refresh operation to avoid losing stored data and the system clock signal. Halting the Super NES may be desirable when higher priority tasks must be performed or if, for example, some other reason exists for halting the video game computer such as during communications or power problems.

As previously indicated, memory board 102 couples game controller data to the video game computer board through controller input lines. Such controller data is coupled to microcontroller 190 via an asynchronous serial port (the SEB port) via an SEB. The controller data is output to the SNES through latch 186 whose output is coupled to a controller data lines as shown in FIG. 5.

The microcontroller 190 also includes a reset output line which is used to reset the video game computer to, for example, recover from a temporary drop in voltage level in the airplane or any other electrical disturbance associated with the relatively hostile airplane environment. The boot ROM program checks to determine whether it is executing as a result of such error condition.

FIGS. 7A–7H depict various configurations of the video game computer address space. The memory configuration accessible by the video game computer CPU is defined by the information stored in registers 158, 160, 162 and 164, as exemplified in FIGS. 7A–7H.

Figure 7A:
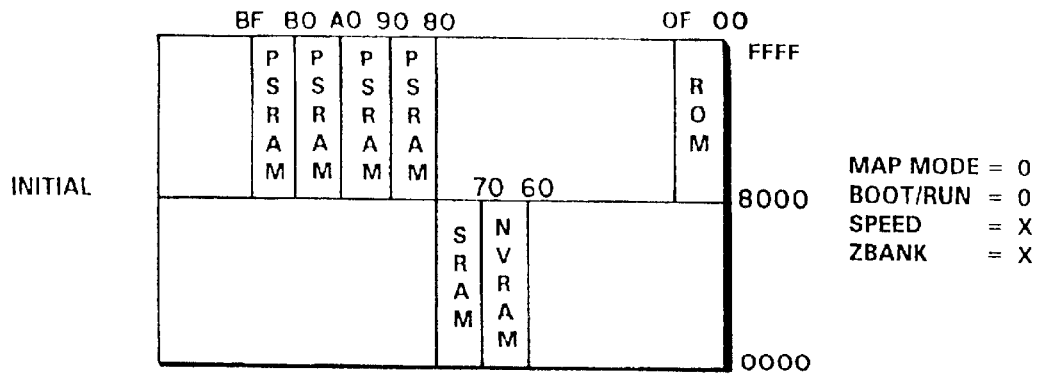
FIGS. 7A through 7H are memory maps showing the memory configuration in various modes of operation.
Figure 7B:
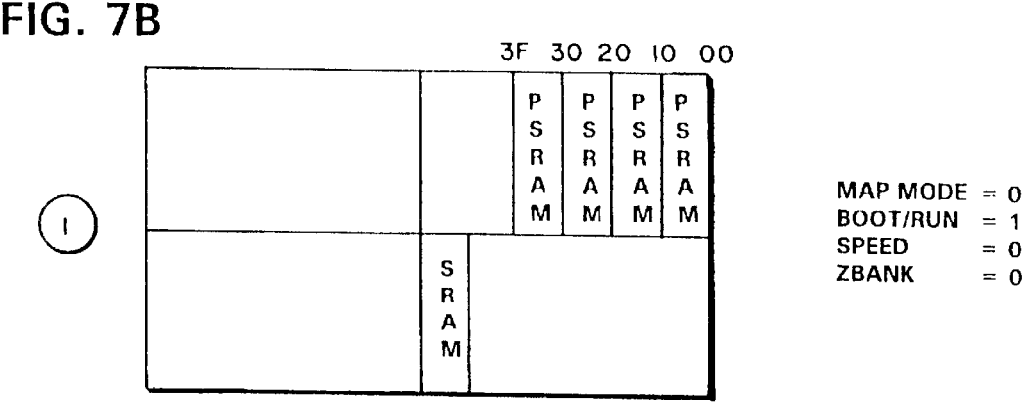
Figure 7C:
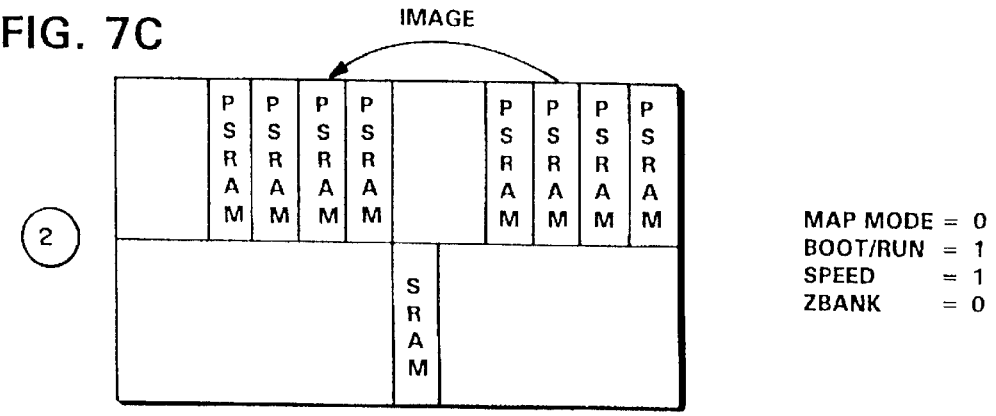
Figure 7D:
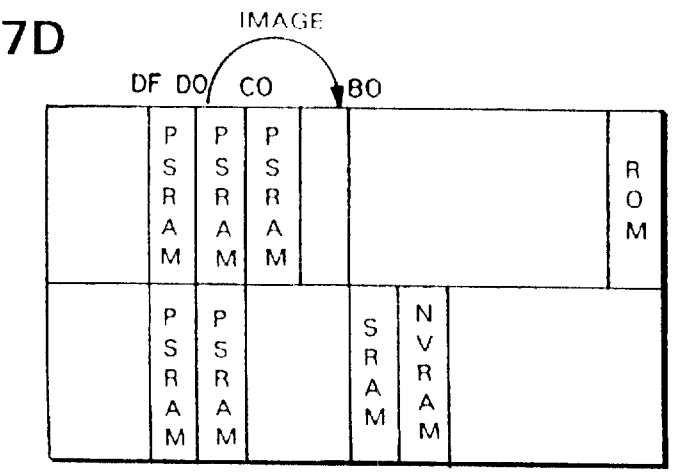

FIGS. 7A and 7D show two exemplary memory configurations after the power is initially turned on. As shown in FIGS. 7A and 7D the boot ROM program is initially executed which is accessed by accessing memory bank 00. During this time period no application program is running, as indicated by the boot/RUN register storing a logical "0". The boot/run bit switches between the boot ROM being mapped to a location for the video game computer to execute (boot/run=0) or the contents of the pseudo-static RAM being mapped to a location position for the video game computer to execute (boot/run=1). As shown in FIGS. 7A and 7D, the contents of the "speed" and "Zbank" registers have no effect on this memory configuration (as indicated by the "X" or "don't care" condition). The registers 158–164 are set in response to the selection of a game program prior to downloading a specific game program.

FIG. 7A reflects the memory configuration which is the standard configuration where the SNES video game computer would normally begin executing out of a game cartridge ROM. In this configuration, the boot ROM embodied on the memory board 102 is mapped in place of the game cartridge ROM. In the initial power up mapping shown in FIG. 7A, the non-volatile RAM, (NVRAM) is accessible by the video game computer to enable the boot ROM program to provide a check of the last status of the system prior to being powered up (which is stored in a non volatile RAM 178). As shown in FIG. 7A during the boot program execution, the pseudo-static RAM 174, the static RAM 176, and the NVRAM 178, are accessible by the CPU.

Figure 7E:
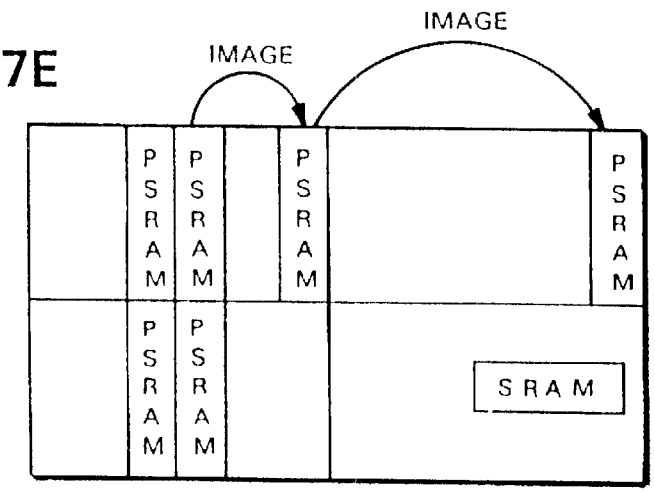

FIGS. 7B, 7C, and 7E define memory three standard address space configurations associated with a wide range of Super Nintendo Entertainment Systems games. As indicated in 7B, 7C, and 7E, the contents of the boot/run register is "1" indicating that the game program is executing.

The memory mapping modes shown in FIG. 7B and 7C differ in that in FIG. 7C an image of the pseudo static RAM locations appears in predetermined lower address memory banks and higher memory address banks. As shown in FIGS. 7B and 7C, the associated register states differ based upon the contents of the "speed" register. As previously indicated, the video game computer system clock generates signals at two different rates. In an exemplary embodiment of the present invention, the high speed clock rate is used to execute programs (stored in an image of lower order PSRAM memory banks) out of higher order address banks.

The Zbank register setting controls the ability of an applications program to, upon completion of execution, permit the video game computer to access the boot ROM to permit down loading of a game program. A game program, however, cannot be permitted to access the boot ROM. The state of the Zbank register is fed back to the decoding logic to indicate that the application program is running. The map mode bit defines in part the address mapping mode to be selected.

If a video game program is running, the state of the Zbank register precludes modification of the speed, Zbank, map mode, or boot run registers. However, if an application program is running, the state of these registers may be later modified.

The memory board 102 shown in FIG. 6 operates as follows. When power is initially turned on, video computer board's CPU is represented as shown FIG. 7A and the program stored in the boot ROM is executed. The boot ROM program execution (which is explained in further detail below) requests the video game computer CPU to write data appearing on the video game computer data lines into latch 188 in response to "data shift in" control signals generated by control decoder 182 in response to signals on the SNES address lines. The microcontroller 190 is informed that data is ready via its "Input Strobe" control input. The MCU 190 reads the data stored in latch 188 and outputs the data to the SNES video game processor, the SDU or the SEB 2.

Data which is to be coupled to the SNES is transmitted loaded by MCU 190 into FIFO 184. The SNES video game computer, when executing programs stored in the boot ROM, monitors FIFO 184 for the presence of a status flag when data is available. The SNES then couples a control signal on its SNES address lines which are decoded by control decoder 182 to generate a "read" signal which is coupled to FIFO 184 which initiates the read out of information from the SNES data lines.

The boot ROM program may then, in response to the read data, initiate the downloading of an applications program, a game identifier which uniquely indicates the game which has been selected and/or mapping mode register indicia that is to be loaded into registers 158–164. The first time the boot ROM program is executed the applications program downloading is initiated. As the application program is downloaded, the boot ROM monitors the FIFO 184 status flag for the presence of information which may be read. The applications program itself is downloaded via a high speed download link through level shifter 194 to the ZILOG serial communication port controller 192 which, in response to control signals from the microcontroller 190, couples data to the microcontroller which, in turn, loads the data and/or instructions to FIFO 184.

Figure 7F:
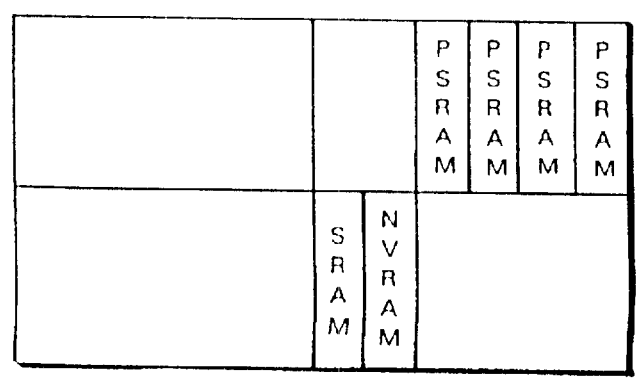
Figure 7G:
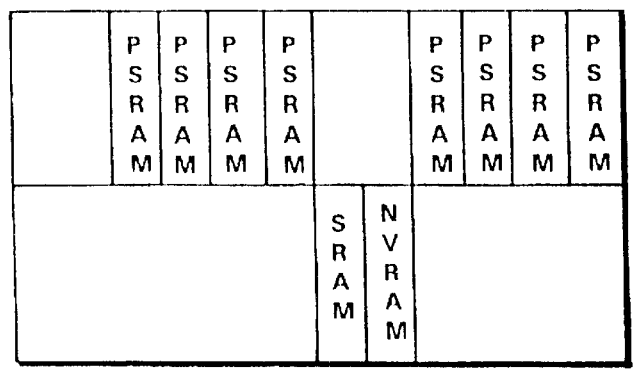
Figure 7H:
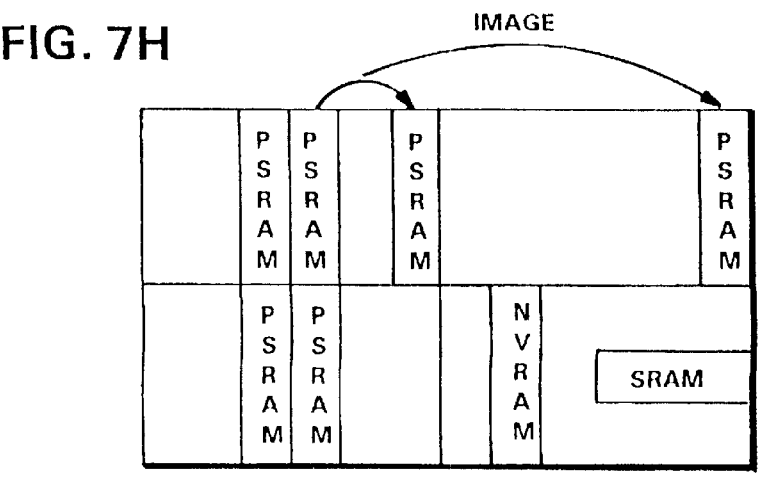

When the applications program is downloaded from the master control unit 2, after being buffered in the FIFO 184, it is loaded into the pseudo-static RAM 174 via the SNES data bus. After the applications program is downloaded, game related parameter data is loaded and stored in the nonvolatile RAM 178. In this fashion, the applications program is able to access during execution the contents of the non-volatile RAM 178 to enable display of such information as the particular games and/or educational programs that are available. When the applications program has been successfully downloaded, the contents of the z bank register is set to "1" and the video game computer memory address space is organized as shown in FIG. 7F–7H.

During the execution of the application program, the user makes the desired menu selections. The menu selections result in the loading of data into latch 188 in FIG. 6. The "Input Strobe" signal is then sent to the microcontroller 190 which triggers the reading of data from latch 188 to result in the menu selection data being sent to the master control unit 2 through an SEB and ADB. The ultimate destination of the data depends upon the user's menu selection which may indicate the need to download a particular video game program, or the user's selection of a movie, shopping or some other mode.

If a game is selected, player control data indicating, for example, the movement of a moving object, e.g., Super Mario, is coupled to the MCU 190 from a SEB which reads the player controller information to latch 186. The player control data is then coupled to the video game controller via SNES controller data lines. The player controller data may indicate, left, right, up, down directional movement of a moving object, or control signals generated by the "A", "B", etc., control buttons on a standard SNES controller.

During execution of the program stored in the boot ROM it is permissible for the contents of registers 158–164 to be changed. Addresses appearing on address lines PA0–PA7 are used to uniquely set or reset each of the four registers 158, 160, 162, and 164. PAL decode logic 150, 152, 154 and 156 prevents associated registers from being set or reset during the time period when the system precludes such a modification. For example, during execution of a game, the decode logic 150 will not permit the clock rate of a game to change.

Figure 8:
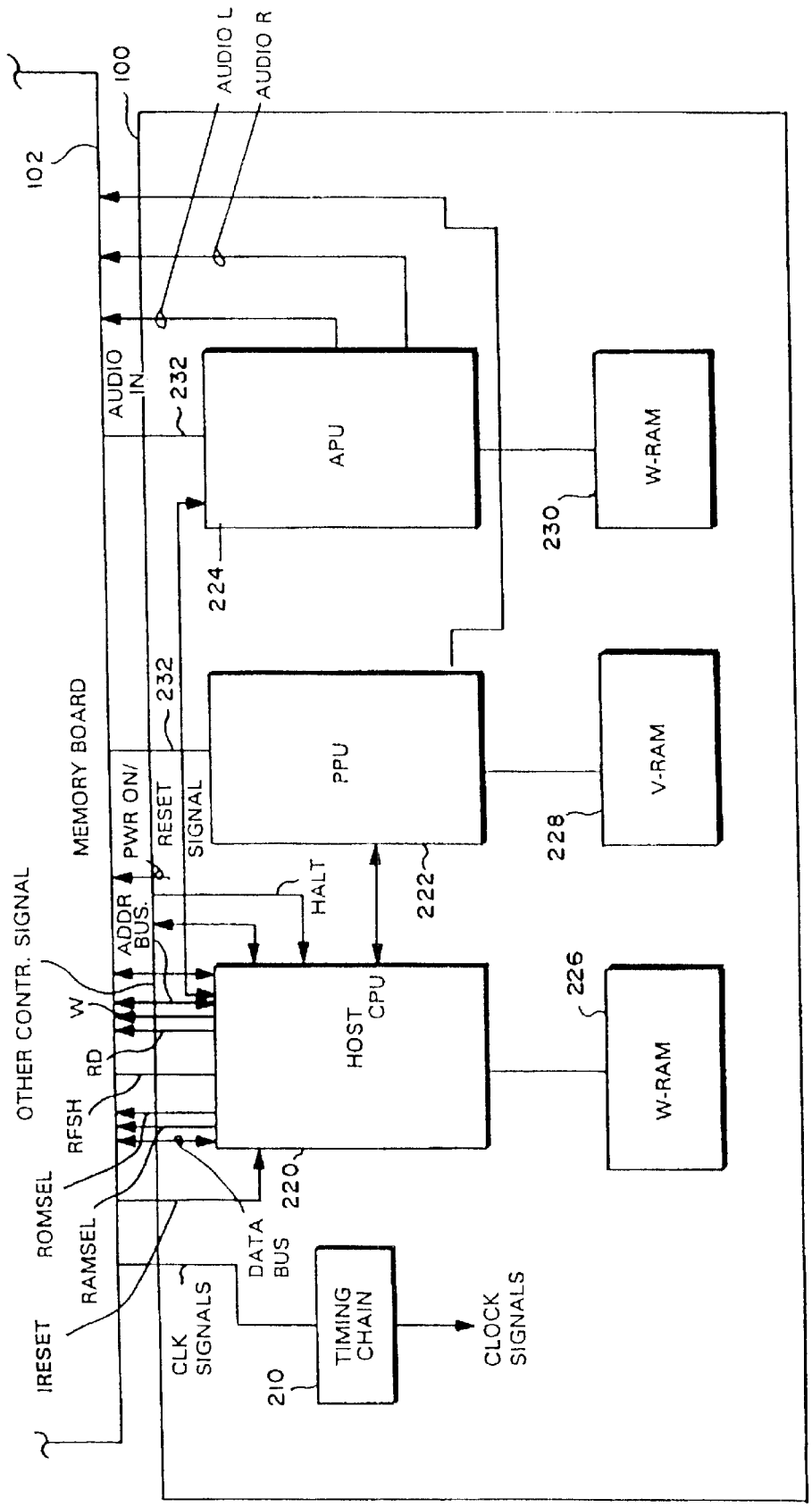
FIG. 8 is a block diagram of an exemplary video game processing circuitry in a seat display unit.

FIG. 8 is a simplified block diagram of an exemplary computer/video game processing system which may be used in conjunction with the present invention. In accordance with the present exemplary embodiment, the computer board may, for example, be the 16 bit video game system commercially sold by Nintendo of America Inc., as the Super Nintendo Entertainment System (Super NES). The Super NES is described in part in U.S. Pat. No. 5,327,158, entitled "Video processing apparatus", which was filed on Apr. 10, 1991 and U.S. Pat. No. 5,291,189, entitled "Direct Memory Access Apparatus and External Storage Device Used Therein", and filed on Aug. 26, 1991 and U.S. application Ser. No. 08/138,488 filed Oct. 20, 1993, entitled "Mosaic picture Display Apparatus and External Unit Used Therefore." These applications are expressly incorporated herein by reference. It should be understood, however, that the present invention is not limited to Super NES related applications and may be used in conjunction with other video game/data processing systems or other non-video game information processing apparatus. Thus, the references throughout the specification to Super NES (SNES) should not limit the scope of the present invention to Super NES related applications or systems having a block diagram such as shown in FIG. 8. The Super NES preferably is modified in a number of respects such as those described herein. The RF modulator circuitry contained in a conventional Super NES system is not embodied in the present exemplary embodiment since the system is not being coupled to a color television monitor. As shown in FIG. 8, the video game computer board 100 is coupled to the memory board 102 which was described in detail in FIG. 6. The host CPU 220 and the other hardware components on board 100, as indicated above, are representative of the Super NES commercially sold by Nintendo of America.

The host CPU 220 is a 16 bit CPU which may, for example, be a 65816 compatible microprocessor. CPU 220 is coupled to a working RAM 226 which may, for example, include 128K bytes of storage. The CPU 220 is coupled to a picture processing unit 222 (which is described in detail in the '265, '530 and '735 applications) which, in turn, is coupled to a video RAM 228. The CPU 220 can only access the video RAM 228 via the PPU 222 at times other than active line scan, when the PPU 222 is accessing video RAM 228. PPU 222 generates a video signal which is coupled to the LCD display 90 shown in FIG. 4. CPU 220 is also coupled to an audio processing unit APU 224 which is coupled to its working RAM 230. The APU 224, which may comprise a commercially available sound chip, generates the sounds associated with the video game stored in the pseudo-static RAM 174 on memory board 102. Host CPU 220 can only access the working RAM 230 via APU 224.

The video RAM 228 in the Super NES is loaded with appropriate character data stored in the pseudo-static RAM 174 (which stores not only the game program but also the character data used during game play). Any moving object or background characters to be displayed are resident in video RAM 228 before display. For further details of the moving object and background character processing the Super NES, see, for example, FIGS. 4 and 5 of U.S. Pat. No. 5,327,158, which has been incorporated herein by reference.

The program storing pseudo-static RAM 174 is accessed by the host CPU 220 via address busses and data busses which are generally shown in FIG. 8. The PPU 222 is connected to the memory board via shared host CPU data and address busses and via connector 234 to provide a path for PPU data and control signals to be coupled to the memory board. The APU 224 is connected to the memory board via shared host CPU busses and audio bus 232.

As previously described and as indicated in FIG. 8, the Super NES generates a variety of control signals. When the Super NES CPU 220 needs to access pseudo-static RAM 174, it generates control signal ROMSEL. To initiate a memory refresh, the Super NES generates a refresh signal RFSH. The host CPU 220 additionally generates read and write signals. System timing signals are generated from timing chain circuitry 210 within the video game processing board 100. A power-on reset signal is also generated within the video game computer board 100 and is coupled to the memory board 102. Other control signals shown in FIG. 8 which are unique to the present airline application implementation have been previously described such as the "halt" control signal and the "IRESET" signal described in conjunction with FIGS. 5 and 6. A more complete portrayal of the signals exchanged between the memory board 102 and the video game/computer board 100 is shown in FIG. 5.

Figure 9A:
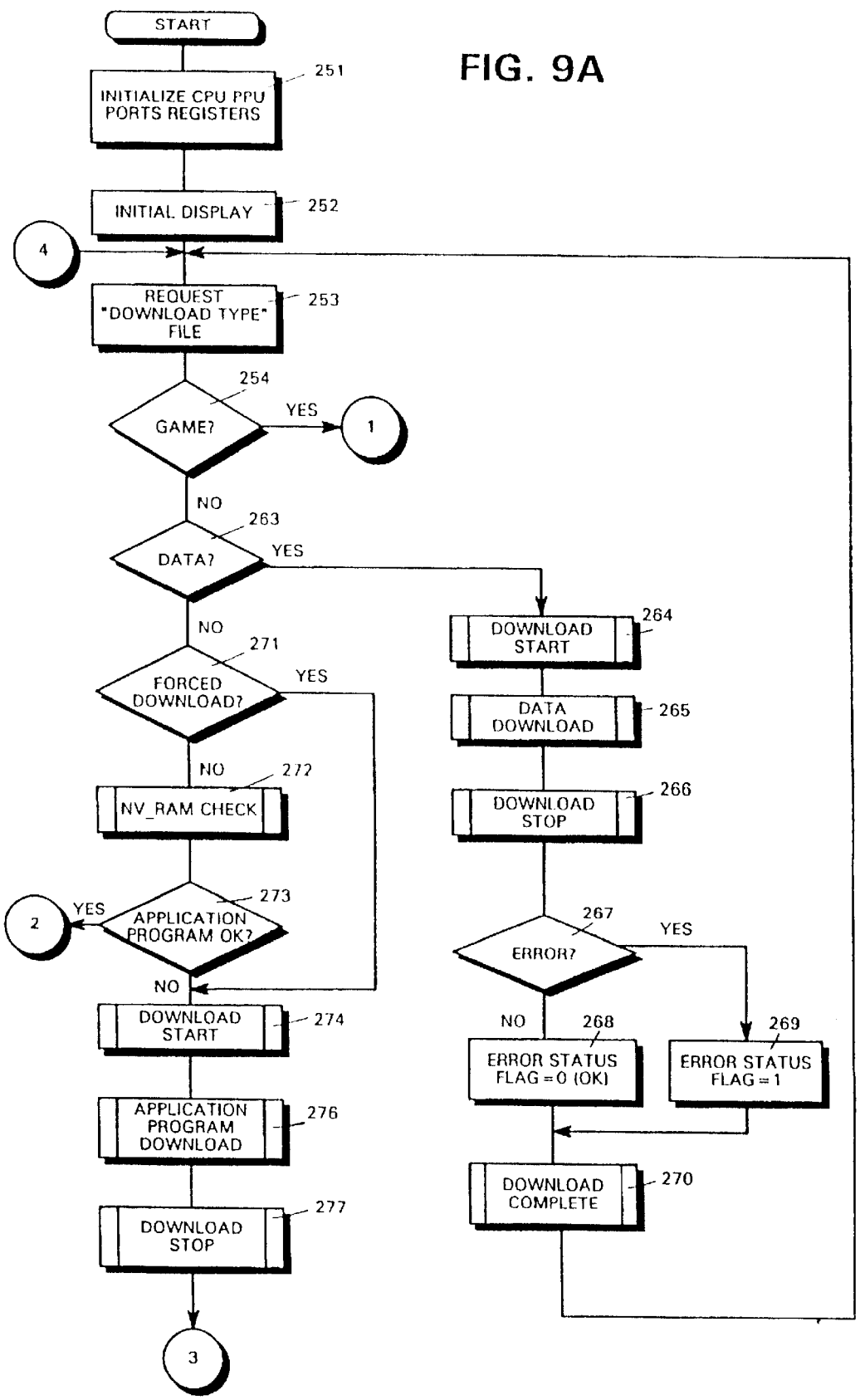
FIGS. 9A–9D are flowcharts delineating the sequence of operations in an illustrative boot program.
Figure 9B:
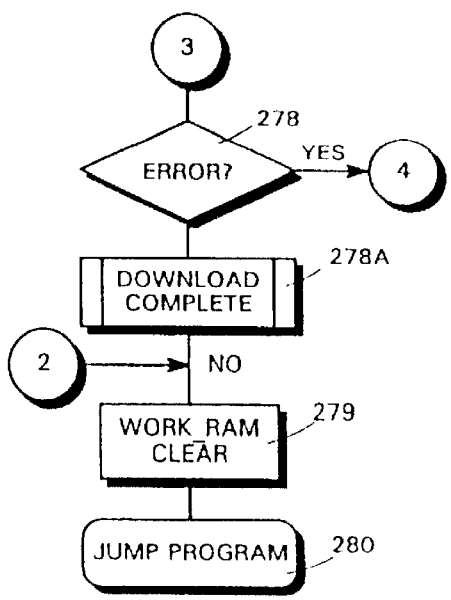
Figure 9C:
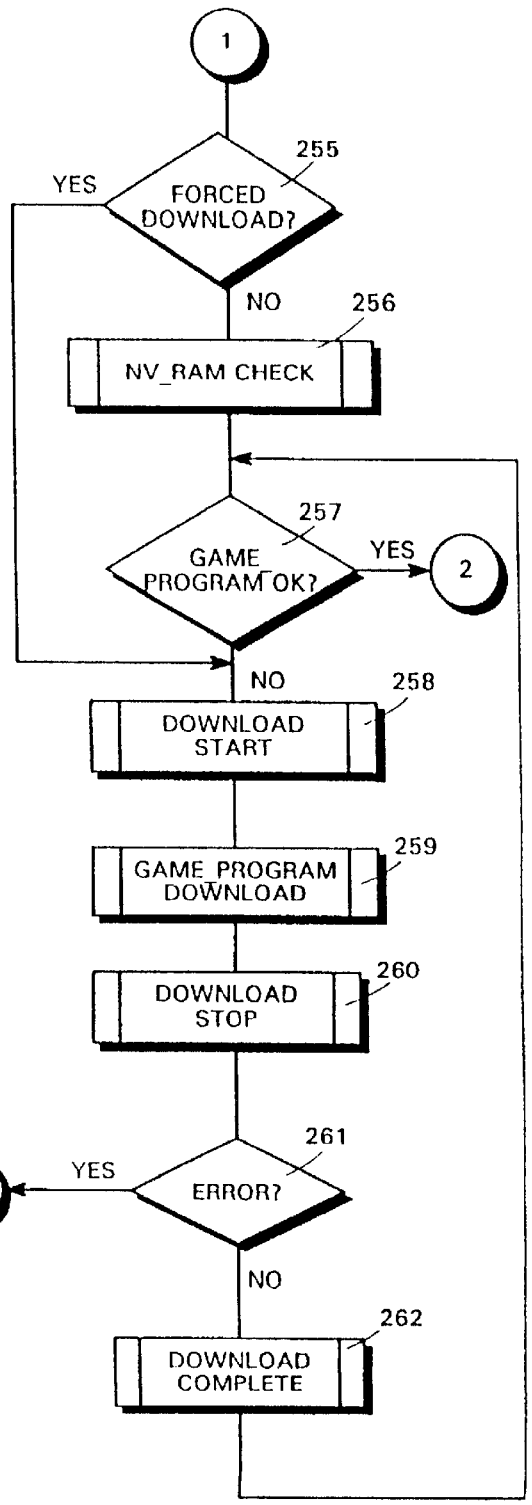

FIGS. 9A–9C are flowcharts which delineate the sequence of operations performed by the ROM boot program. When the boot program begins executing, the CPU 220, PPU 222, registers and ports associated with the video game/computer board 100 are initialized (251). After initialization, a display screen is generated on the LCD display 90 (252). The initial display screen alerts the user that a program or data downloading operation is occurring. A screen display is preferably generated to maintain the user's interest for the short period of time that the downloading operation takes place. Thereafter, a "download type file" request is made to the SDU via the microcontroller interface 84.

The response to the "download type file" request identifies whether an applications program, game program, or data file is to be downloaded. The response also identifies whether a forced download is to occur. In a forced download, the download is implemented regardless of the current memory contents. In a non-forced download, a check is made of memory to determine whether the file to be downloaded information already resides in memory. If the information is not resident in the memory, then the request is coupled to an SEB for downloading.

In accordance with block 254, a check is made of the response received to the "download type file" request to determine whether a game is to be downloaded. If a game has been requested, the routine branches to block 255 shown in FIG. 9C. At block 255, a determination is initially made whether a forced download is to occur. If a forced download is not to occur, then a check is made of the non-volatile RAM memory 178 (256 and 257) to determine whether the file in question had already been downloaded. If the check at block 257 indicates that the game program file is already in memory, then the routine branches to block 279 of FIG. 9B where the working RAM is cleared. The routine then jumps to the game program which is resident in memory.

If the game program file is not resident in memory or if a forced download was determined to occur in block 255, then the downloading process starts (258). The downloading then process is performed (259) until completion (260). The downloading process is performed as described above in conjunction with FIGS. 3A and 3B.

A check is then made to determine whether errors occurred during the downloading process (261). If an error is detected, then the routine branches to block 253 in FIG. 9A where the downloading process begins again. If no errors are detected, then the downloading process is completed (262) and the routine branches back to block 257, where a check is made to determine that the game program is now resident in memory. The check in block 257 should then reveal that the file is resident in memory and the routine branches to block 279 where the working RAM is cleared and the program execution begins (280) as shown in FIG. 9B.

Turning back to FIG. 9A, if the check at block 254 reveals that a game program is not requested, then a check is made in block 263 to determine if a data file has been requested. If a data file has been requested, the routine starts the downloading process for the data file (264). After requesting the data file to be downloaded, the system waits for receipt of the first byte of data (265). The data is then received (266) in accordance with the methodology described above in conjunction FIG. 3A and 3B. A check is next made to determine whether any errors occurred in the downloading process (267). If an error is detected in the downloading process (267), then an error status flag is set (269). If no error is detected, then the error status flag indicates a logic "0" condition (268). The error status flag setting completes the downloading process (270) and the routine branches back to block 253 to begin the downloading process again by requesting a "download type" file to determine what needs to be done next with the data that has been downloaded.

If the checks in block 254 and 263 reveal that neither a game program nor data has been requested, then in the present exemplary embodiment, an applications program has been requested. A check is made at block 271 to determine whether a forced download is to occur. If a forced download has been requested, then the routine branches to block 274 to initiate the applications program downloading process which is performed in block 276 and completed in block 277 using the methodology described above in FIGS. 3A and 3B. The routine then branches to block 278 in FIG. 9B where an error check is made on the downloading process. If no error is detected, download is completed (278A), the working RAM is cleared (279) and the applications program is executed (280). If an error is detected then the routine branches back to block 253 to begin the downloading process again.

If the check in block 271 reveals that no forced download was initiated, then the nonvolatile RAM 178 is checked (272). A determination is made based on the nonvolatile RAM 178 contents as to whether the applications program is resident in storage. If not, then the process described above, beginning at block 274 begins to initiate downloading. If the application program is resident in storage as determined at block 273, then the routine branches to block 279, where the working RAM is cleared and program execution begins (280).

Figure 9D:
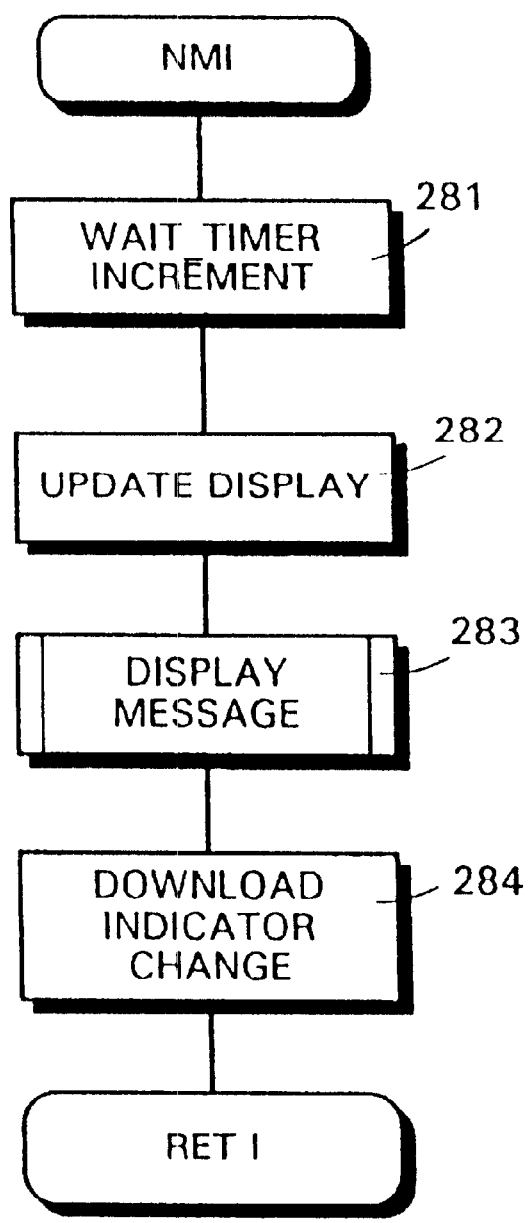

FIG. 9D describes the sequence of operations which occur during boot ROM non-maskable interrupt processing, which is the only interrupt that may occur in the boot ROM program. As indicated in block 281, a "wait" timer is incremented which is used to control various timers, such as the timer which controls the allowable waiting time for a download to start. Next, as indicated in block 282, the display is updated with clock information (e.g., hand movement) to indicate on-going operation of the system. Any additional messages which need to be displayed are then displayed (283). In an exemplary embodiment of the present invention, during the downloading process, a downloading indicator is changed (284) to indicate the degree of download completion. After the interrupt routine is exited, the routine goes back to the main boot routine shown in FIGS. 9A through 9C.

FIGS. 10A–10I is a flowchart which delineates the sequence of operations performed by the microcontroller (MCU) 190 shown in FIG. 6. The microcontroller 190 executes software which is interrupt driven and which continuously check various status flags. Depending upon the state of the status flags microcontroller 190 proceeds to either send data or receive data on a byte-by-byte basis.

Figure 10A:
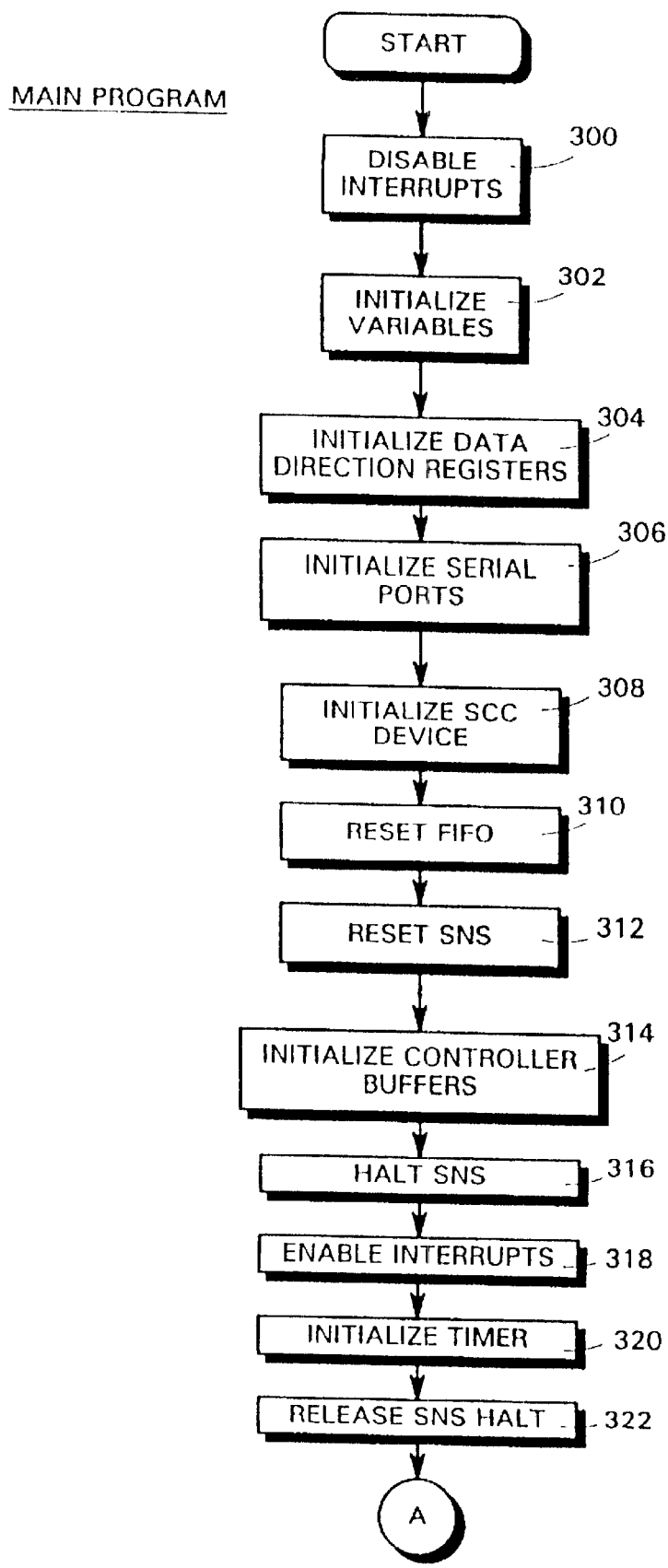

Turning to FIG. 10A, a series of initialization steps are performed to begin the controller's main program loop. Once power is turned on, as indicated in block 300, the interrupts associated with the microcontroller 190 are disabled. Thus, if serial data is received on the controller's input port during this time period, the initialization is not be interrupted. Thereafter, variables are initialized which are utilized to determine what action is to be taken (302). As indicated at block 304, data direction registers associated with the MCU 190 are initialized to determine whether a particular pin is to operate as an input pin or output pin. Thereafter, the MCU serial ports are initialized to set the appropriate baud rates, and the number of start, stop and parity bits (306). Thereafter, the baud rate to be associated with the serial communication controller (192) ports are initialized (308). The microcontroller 192 software then resets the FIFO 184 (310) and resets the Super NES CPU 220 and PPU 222 (312) to ensure that the Super NES begins executing out of the boot ROM 180. Thereafter, buffers which couple the Super NES player controller data to the SNES are initialized (314). As indicated in step 316, the Super NES is then halted and MCU 190 interrupts are enabled (318). The built-in timer is then initialized (320). This timer is used in the MCU 190 to trigger time-controlled interrupts which are initialized when the timer, for example, counts down to zero from an initial value. The initialization process is completed upon the release of the SNES from its halt state (322).

Figure 10B:
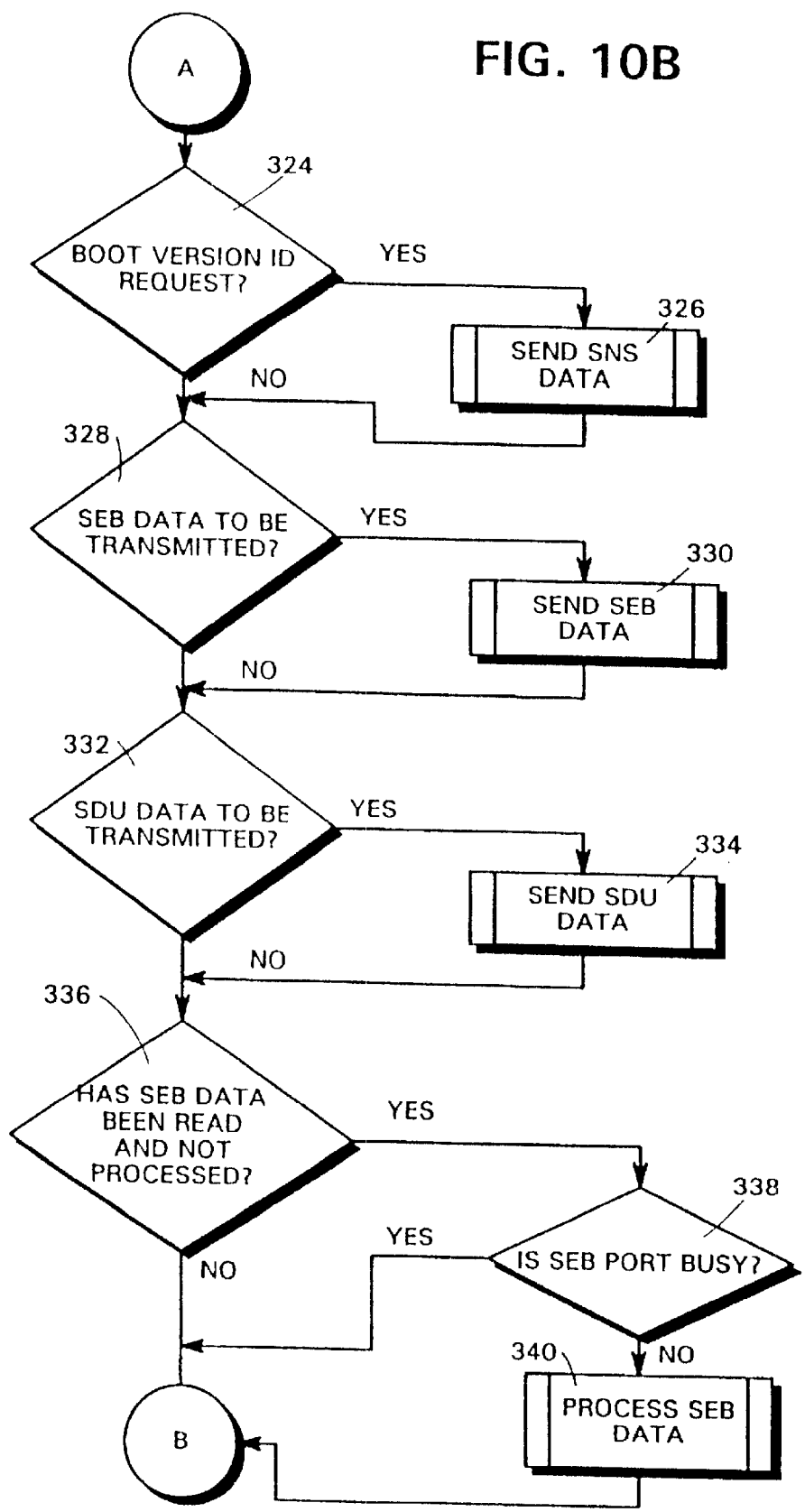
Figure 10C:
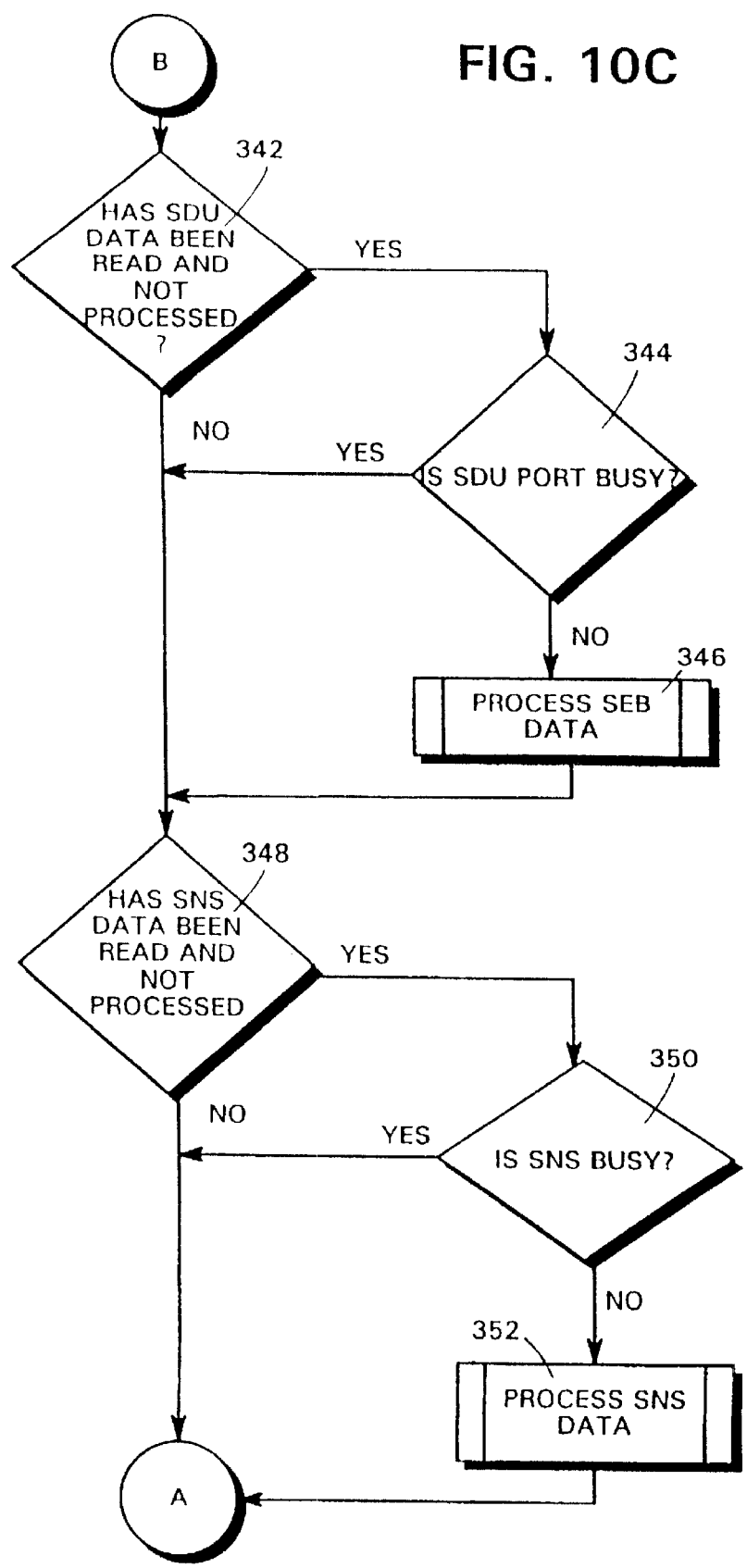

Turning to FIG. 10B, a significant portion of the MCU 190 program is dedicated to checking the state of various status flags and performing operations in response thereto. One such status flag determines whether the boot "version ID" has been requested (324). Thereafter, if the flag indicates that there has been a version ID request, then a boot version ID Request is sent to the SNES (326). If the version ID request flag has not been set or if the data has been sent in block 326, the routine progresses to block 328, where a check is made to see whether there is SEB data to be transmitted. If so, then the SEB data is sent (330).

If no SEB data is to be transmitted or if the SEB data has already been sent, the routine proceeds to block 332, where a flag is checked to determine whether SDU data is to be transmitted. If SDU data is to be transmitted, as indicated in block 334, the SDU data is transmitted. If the SDU data is not to be transmitted, or if the data has been sent, then the routine enters a "data receive" mode and checks to see if SEB data has been read and not processed (336). The determination in block 336 indicates whether data has been received at the serial port and stored in a buffer of MCU 190.

If there is data in the buffer, then a check is made to determine whether the SEB port is busy (338). If the SEB port is not busy, as indicated in block 340, the SEB data is processed in one byte increments. If the SEB port is busy, if the check at block 336 yields a "NO" response, or if the data has already been processed, the routine branches to block 342 which is checked to determine whether SDU data has been read and not processed. If SDU data has been read and not processed, a check is made to determine whether the SDU port is busy (344). If not, then the SEB data is processed one byte at a time (346).

If the SDU data has not been read and not processed (342), if the SDU port is busy, or if the SEB data has been processed, then the routine branches to block 348, where a flag is checked to determine whether the SNES data has been read and not processed. If the SNES data has been read and not processed, then a check is made to determine whether the SNES is busy (350). If the SNES is not busy, then the SNES data is processed, one byte at a time (352). If the check at 348 reveals that the SNES data has not been read and not processed, if the SNES is busy, or if the SNES data has been processed, then the routine branches back to FIG. 10B at block 324.

In essence, the MCU 190 time shares processing time between the SEB data, SDU data and SNES data for processing one byte at a time. Data is sent from the MCU 190 out to other system components one byte at a time. The MCU 190 in this fashion services all units at the same time by appropriately routing information which is to be transmitted and/or received.

Figure 10D:
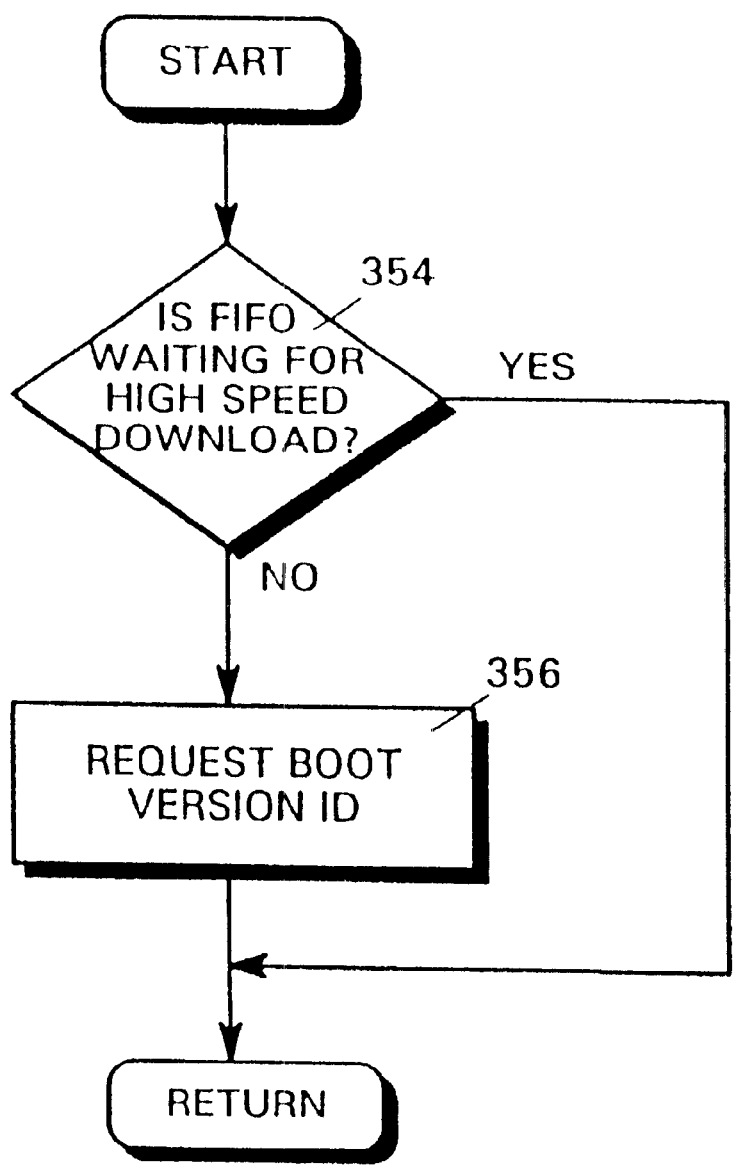

FIG. 10D shows the operations involved in sending SNS data according to block 326. A check is first made to determine whether FIFO 184 is waiting for high speed download as indicated in block 354. If FIFO 184 is not waiting, then a request for boot version ID is sent (356). If FIFO 184 is waiting, then the routine returns to the main program.

FIG. 10E is a flowchart which indicates in further detail the manner in which both the "send SEB" and "send SDU" data operations of blocks 330 and 334 of FIG. 10B are carried out. The operations for these "send SEB" and "send DSU" data transmissions are substantially the same and accordingly both are described in the flowchart of FIG. 10E. These transmission steps takes place when data is to be sent out of the MCU 190 SEB serial port or the MCU 190 SDU serial port.

A check is first made of the SEB port (or SDU port) to make sure that it is ready for transmission (368) and the MCU 190 waits until the ready state is reached. If the SEB (or the SDU) port is ready for transmission, the associated internal buffer in the MCU 190 will be empty. If so, the MCU 190 sends a byte of data to either the SEB or the SDU(i.e., the interface controller 84). If the SEB (or SDU) port is not ready for transmission, then the routine enters a wait state until the port is ready for transmission. After a byte has been sent in block 370, a check is made to determine whether all bytes have been sent (373). If all bytes have not been sent, then the routine is exited so that the time shared processing may continue for other ports as shown in FIG. 10B. If all bytes have been sent, as determined in block 372, then a status flag is reset (374). The setting of the status flag indicates that an additional message may be sent to the SEB (or the SDU) since the previous message has already been sent.

Figure 10F:
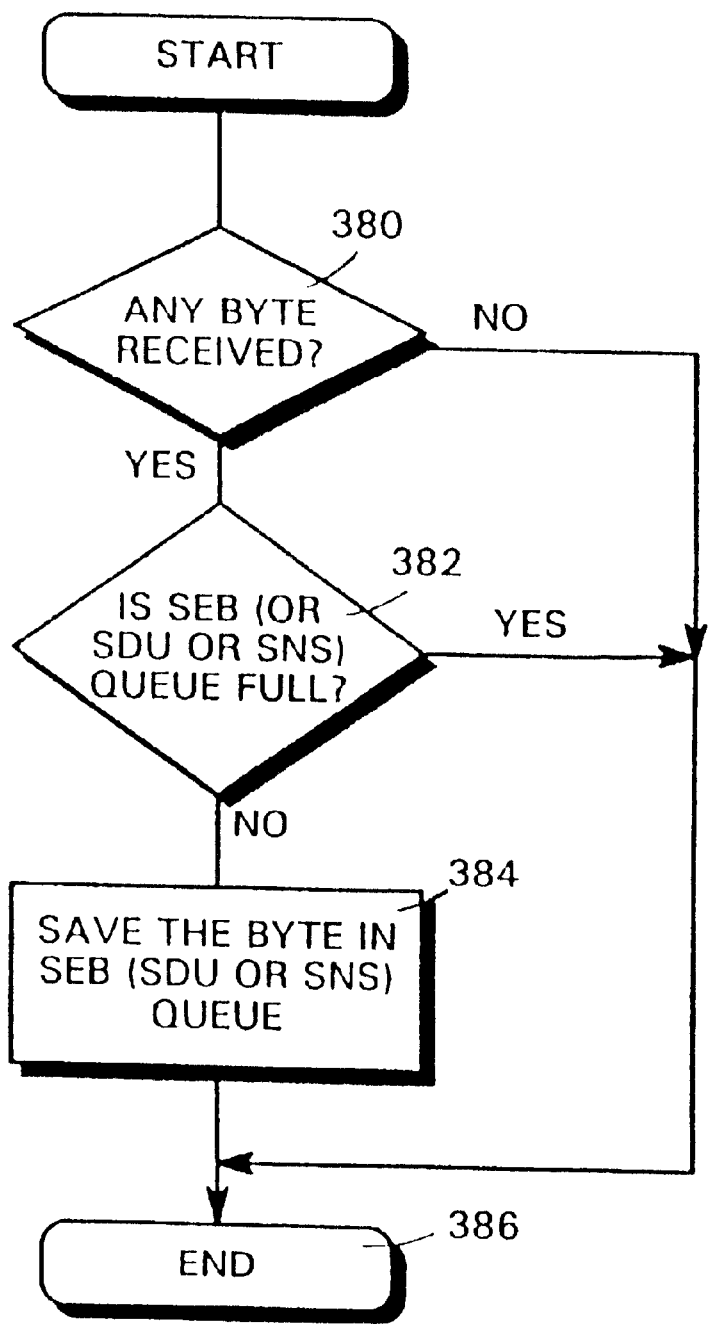

FIG. 10F is a flowchart which represents the sequence of operations performed when data is received on a particular MCU 190 port. Like FIG. 10E, the flowchart in FIG. 10F is descriptive of the operations that are performed when information is received at both the SEB port and the SDU port. Additionally, the operations are descriptive of data reception at an SNES port. Initially, a check is made at block, 380 to determine whether any byte has been received at the SEB port (or SDU or SNES port). If a byte has been sent, then a check is made in block 382 to determine if the associated queue is full. If the check in block 382 reveals that the associated queue is not full, then the byte is retrieved and placed in the appropriate SEB, SDU, or SNS queue (384). If the associated queue is full or if no byte was received, then the routine exits at block 386.

Using the routines shown in FIGS. 10D, 10E, and 10F, the SEB, SDU and SNES ports serve as full duplex ports where data is both sent and received on each port. The SNES port is a parallel port and the SDU and SEB ports are serial ports.

FIGS. 10G and 10H are flowcharts which depict the sequence of operations performed when either SEB, SDU or SNES data is processed by the MCU 190. A check is initially made of the appropriate SEB, SDU, or SNES queue in MCU 190 to determine whether a byte has been received for processing. If so, one byte is taken from the appropriate queue (400). The routine shown in FIG. 10G operates on one byte at a time.

After a byte is retrieved from the relevant queue, a check is made to determine whether the message is complete (462). Thus, if SEB data is being processed, a check is made to determine if the SEB message is complete. If SNES or SDU data is processed, then the check determines if the SNES or SDU message is completed. If the message is not complete, then the routine exits because the message is not ready to be processed. The next time the processing routine is performed, the next byte is retrieved until the complete message is obtained for processing.

If the message is complete, then a checksum is performed on the entirety of the message (404). If the checksum determination reveals an error, then a status flag is reset (406) and the message processing ceases and the routine is exited. If the checksum is correct, then a number of further checking operations are performed.

If the message is for the SEB (408) then, the message is sent to the SEB port (410). If the message is for the SDU, then the message is sent to the SDU port (410) and the routine exits.

If the check at block 408 yields a "NO" response, then a check is made at block 412 to determine whether the message is addressed to the SNES port. If the message is addressed to the SNES port, then block 414 is implemented by coupling the message to FIFO 184 (which is coupled to the SNES data lines) shown in FIG. 6.

In processing SEB, SDU or SNES data, the routine then determines, if the response in block 412 is "NO", whether the command portion of the received message is a reset request (416). If a "reset" request has been received, then the MCU 190 resets itself (418). After the reset operation, the processing routine is exited.

If the check at block 416 reveals that a reset request has not been made, then in the case of SDU data processing only, a check is made to determine whether the command is a CPU pause request (419). If a pause request has been detected, then the CPU will be commanded to halt (421). If a CPU pause request is not detected, then in the case of SDU data, a check is made to determine if a CPU resume operation request has been made (423). If the command is a CPU resume request, in the case of SDU processing, the CPU will be resumed (425) and the routine will exit.

If the detected message command is not a CPU resume request, or if SEB or SNES data is being processed, then a check is made to determine whether a version ID request has been made as shown in block 420. If the version ID request has been made, then the version ID request is sent to either the SEB (if SEB data is being processed) or to the SDU (if SDU is being processed) (422). If SNES data is being processed, instead of checking whether a version ID request has been made, a check is made to determine whether the version ID request has been sent, and if so, the version ID is saved.

In the case of processing SEB data only, if block 420 indicates that a version ID request has not been made, a determination is made as to whether the data received is controller data (424). If controller data has been received, then as indicated at block 426, the data is sent by the MCU 190 to the latch 186 (in FIG. 6) and to the SNES controller data lines. For SEB data, the command portion of the received message indicates that the controller data is included in the message. Such processing is not done if SDU or SNES data is being processed by the MCU 190.

If the check in block 424 indicates that controller data has not been received, then a check is made to determine whether a status of various flag states have been requested (428). Status flags may indicate error conditions in high speed download operations or numerous other status conditions. If the check in block 428 indicates that a status message has been requested, then the status is sent to either the SEB, SDU or SNES depending upon whether SEB, SDU or SNES data is being processed (430) and the routine exits. If the check at block 428 reveals that a status flag state has not been requested, then the system determines that the unknown message is being processed and the processing routine is exited.

Figure 10I:
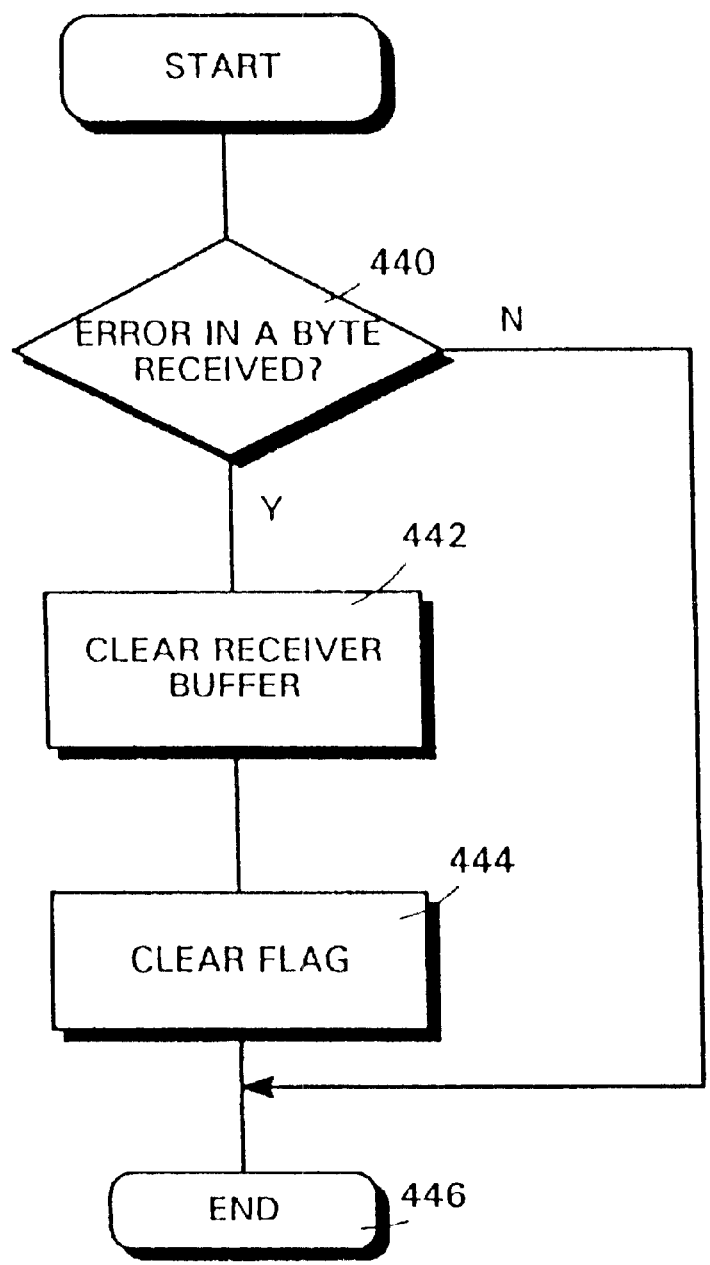

FIG. 10I is a flowchart which delineates the sequence of operations if the MCU 190 detects an error in receiving data on one of its serial ports. If an error is detected, an internal interrupt routine causes branching to block 440 which determines whether there is an error in the byte received. If so, the receiver buffer is cleared (442) to delete the erroneous data. The flags which triggered the interrupt are then cleared (444) and the error routine is exited.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a passenger entertainment system having a master control unit having a memory for storing a plurality of programs, a passenger seat display unit, coupled to said master control unit comprising:
   a passenger seat display;
   a memory system for receiving at least one of said plurality of programs from the master control unit memory,
   a processor for executing at least one of said plurality of programs and having a memory system address space having a plurality of different memory address space configurations, each memory address space configuration having a different memory addressing scheme; and
   memory configuration control circuitry for selectively defining one of the different memory address space configurations.

2. A passenger seat display unit in accordance with claim 1, wherein said at least one of said plurality of programs is a video game program.

3. A passenger seat display unit in accordance with claim 1, wherein said display displays videographics data resulting from the execution of said at least one of said plurality of programs.

4. A passenger seat display unit in accordance with claim 1, wherein configuration control circuitry includes a boot read-only memory for storing a program to be executed by said processor upon the power being turned on.

5. A passenger seat display unit according to claim 1, wherein the memory system is included on a first circuit board and the processor is included on a second circuit board the passenger seat display unit further including an interface control processor included on the first circuit board for receiving downloaded information to be coupled to said processor for processing.

6. A passenger seat display unit according to claim 5, further including a display interface processor coupled to said interface control processor on the memory system circuit board.

7. The passenger seat display unit in claim 1, wherein the configuration control circuitry configures a number of memory banks in the memory system based on the type of program to be executed.

8. The passenger seat display unit in claim 1, wherein the configuration control circuitry configures a memory bank number corresponding to one of plural memory banks in the memory system based on the type of program to be executed.

9. The passenger seat display unit in claim 8, wherein the configuration control circuitry configures a starting address for the one memory bank based on the type of program to be executed.

10. The passenger seat display unit in claim 8, wherein the configuration control circuitry configures a number of bytes in the one memory bank based on the type of program to be executed.

11. The passenger seat display unit in claim 1, wherein the memory system includes:
   a pseudo-static RAM for storing either a game program or an applications program, and
   another RAM for storing data.

12. The passenger seat display unit in claim 1, wherein the memory system includes plural memory mapped modes, and wherein the configuration control circuitry includes one or more registers for configuring the memory system in accordance with one of the plural memory mapped modes.

13. The passenger seat display unit in claim 1, wherein the configuration control circuitry includes one or more registers for controlling a speed at which the one program is executed.

14. The passenger seat display unit in claim 1, wherein the configuration control circuitry includes a boot ROM program that when executed initiates and controls downloading of programs from the master control unit to the memory system.

15. The passenger seat display unit in claim 14, wherein the configuration control circuitry includes one or more registers for determining whether the boot ROM program or a downloaded program is to be executed.

16. A passenger seat display unit in accordance with claim 1, wherein the plurality of programs include different types of programs, and wherein the memory configuration control circuitry is configured to provide one of the different memory address space configurations corresponding to the type of program received from the master control unit memory.

17. A passenger seat display unit in accordance with claim 1, wherein the different memory addressing schemes include different memory mapping modes.

18. In a passenger entertainment system having a host computer, an array of videographics processing systems, and a plurality of passenger seat display devices, a method of operating said passenger entertainment system comprising the steps of:
   displaying a display menu at one or more of said passenger seat display devices to permit the selection of one of a plurality of videographics program options;
   downloading a videographics program in response to a passenger selection from said host computer to a videographics processing system associated with said one or more of said passenger seat display devices;
   modifying a configuration of memory space in said videographics processing system using configuration control circuitry depending upon the downloaded videographics program;
   storing the downloaded videographics program in accordance with the modified memory space configuration; and
   executing the videographics program.

19. A method according to claim 18, wherein said downloading step includes the step of monitoring information that is downloaded and aborting the downloading operation if the information being monitored is not in a predetermined format.

20. A method according to claim 19, wherein said monitoring step includes the step of checking to determine whether a starting address identifying the memory location at which a downloaded program is expected to be stored has been transmitted.

21. The method in claim 18, wherein a number of memory banks in the memory system is configured based on the information to be downloaded.

22. The method in claim 18, the modifying step including:
   configuring one of plural memory banks in the memory system based on the information to be downloaded.

23. The method in claim 22, the modifying step including:
   configuring a starting address based on the information to be downloaded.

24. The method in claim 22, the modifying step including:
   configuring a number of bytes in one of plural memory banks in the memory system based on the information to be downloaded.

25. The method in claim 18, further comprising:
   controlling a speed at which a downloaded program is executed.

26. In a passenger entertainment system having a master control unit including a storage device for storing a plurality of computer programs, and a plurality of seat display units, each seat display unit including a memory system having a non-volatile memory for storing at least one program, a method of operating said entertainment system comprising the steps of:
   checking said seat display unit non-volatile memory for the presence of a first program;
   checking to determine whether the first program may be validly executed;
   initiating by said seat display unit of a program downloading operation of said first program from said master control unit if said first program is not present or if said first program may not be validly executed; and
   executing said first program if said first program is resident in said seat display unit non-volatile memory and may be validly executed.

27. In a passenger entertainment system having a master control system including a storage device for storing a plurality of computer programs, a passenger seat display unit comprising:
   a memory system for receiving at least one of said plurality of programs downloaded from said master control system;
   a display unit;
   a first data processor, coupled to said memory system and to said display unit, for executing said at least one program to generate graphics signals for said display unit;
   a picture data processor coupled to the first data processor for providing graphic signals to the display unit;
   configuration control circuitry for controlling one or more parameters of the memory system and the first processor depending on the type of computer program being downloaded and executed.

28. A passenger seat display unit in accordance with claim 27, wherein said picture data processor supplies at least one of color, contrast, and brightness control signals to said display unit.

29. The passenger seat display unit in claim 27, wherein the configuration control circuitry configures a number of memory banks in the memory system depending on the type of computer program being downloaded.

30. The passenger seat display unit in claim 27, wherein the configuration control circuitry configures a memory bank number corresponding to one of plural memory banks in the memory system depending on the type of computer program being downloaded.

31. The passenger seat display unit in claim 30, wherein the configuration control circuitry configures a starting address for the one memory depending on the type of program being downloaded.

32. The passenger seat display unit in claim 30, wherein the configuration control circuitry configures a number of bytes for the one memory depending on the type of program being downloaded.

33. The passenger seat display unit in claim 27, wherein the memory system includes:

a pseudo-static RAM for storing a downloaded program, and another RAM for storing download data.

34. The passenger seat display unit in claim 27, wherein the memory system includes plural memory mapped modes, and wherein the configuration control circuitry includes one or more registers for configuring the memory system in accordance with one of the plural memory mapped modes.

35. The passenger seat display unit in claim 27, wherein the configuration control circuitry includes one or more registers for controlling a speed at which a downloaded program is executed.

36. The passenger seat display unit in claim 27, wherein the configuration control circuitry includes a boot ROM program that when executed initiates and controls the downloading.

37. The passenger seat display unit in claim 36, wherein the configuration control circuitry includes one or more registers for determining whether the boot ROM program or the downloaded program is to be executed.

* * * * *